US 8,914,719 B2

(12) United States Patent
Sugimoto

(10) Patent No.: US 8,914,719 B2
(45) Date of Patent: Dec. 16, 2014

(54) APPARATUS AND METHOD FOR EDITING DOCUMENT, AND COMPUTER-READABLE STORAGE MEDIUM FOR COMPUTER PROGRAM FOR EDITING DOCUMENT

(75) Inventor: Kunihiko Sugimoto, Yawata (JP)

(73) Assignee: Konica Minolta, Inc., Tokyo (JP)

( * ) Notice: Subject to any disclaimer, the term of this patent is extended or adjusted under 35 U.S.C. 154(b) by 335 days.

(21) Appl. No.: 12/860,177

(22) Filed: Aug. 20, 2010

(65) Prior Publication Data

US 2011/0047454 A1    Feb. 24, 2011

(30) Foreign Application Priority Data

Aug. 21, 2009  (JP) ................................ 2009-192563

(51) Int. Cl.
  *G06F 17/00*  (2006.01)
  *G06F 17/21*  (2006.01)
(52) U.S. Cl.
  CPC .................................. *G06F 17/211* (2013.01)
  USPC ........... 715/243; 715/244; 715/245; 715/246; 715/247; 715/248; 715/249; 715/250; 715/251; 715/252; 715/253; 715/254; 715/255; 715/233; 715/783; 715/790; 358/1.15
(58) Field of Classification Search
  CPC .... G06F 17/211; G06F 3/1205; G06F 3/1207
  USPC .......... 715/243–255, 233, 783, 790; 358/1.15
  See application file for complete search history.

(56) References Cited

U.S. PATENT DOCUMENTS

| 2006/0291005 A1* | 12/2006 | Genda ........................... 358/474 |
| 2007/0008566 A1* | 1/2007 | Leone et al. ................. 358/1.13 |
| 2007/0188810 A1* | 8/2007 | Nakagama et al. ............ 358/2.1 |
| 2007/0253020 A1* | 11/2007 | Hull et al. ..................... 358/1.15 |
| 2008/0007741 A1* | 1/2008 | Shinchi et al. ................. 358/1.1 |
| 2008/0174811 A1* | 7/2008 | Tanaka et al. ................ 358/1.15 |
| 2008/0291495 A1* | 11/2008 | Yu ................................ 358/1.15 |

FOREIGN PATENT DOCUMENTS

| JP | 7-200551 | 8/1995 |
| JP | 10-171802 | 6/1998 |
| JP | 2007-124233 | 5/2007 |
| JP | 2007-317225 | 12/2007 |

OTHER PUBLICATIONS

Japanese Notification of Reason(s) for Refusal mailed Jul. 5, 2011, directed to Japanese Application No. 2009-192563; 5 pages.

(Continued)

*Primary Examiner* — Quoc A Tran
(74) *Attorney, Agent, or Firm* — Osha Liang LLP

(57) ABSTRACT

An apparatus for editing a document containing a plurality of pages each of which includes one or more first objects is provided. The apparatus includes: an adding portion that adds a second object to each of the pages; an extraction portion that extracts, from the pages, a possible improper page that is a page to which the second object is probably not added properly, the possible improper page being extracted for each cause due to which the second object is not added properly; a quantity display portion that displays, for each cause, a quantity of the possible improper page thus extracted; an excluding portion that excludes, from the possible improper page, a selected page that is a page corresponding to the cause selected by a user; and an informing portion that informs the user of a to-be-confirmed page corresponding to the possible improper page remaining after excluding the selected page.

21 Claims, 37 Drawing Sheets

(56) References Cited

OTHER PUBLICATIONS

Second Office Action dated Sep. 25, 2012, directed to Chinese Application No. 201010259419.0; 15 pages.

Fourth Office Action dated Jul. 31, 2013, directed to Chinese Patent Application No. 201010259419.0; 12 pages.

Third Notification of Office Action dated Jan. 25, 2013, directed to Chinese Application No. 201010259419.0; 14 pages.

* cited by examiner

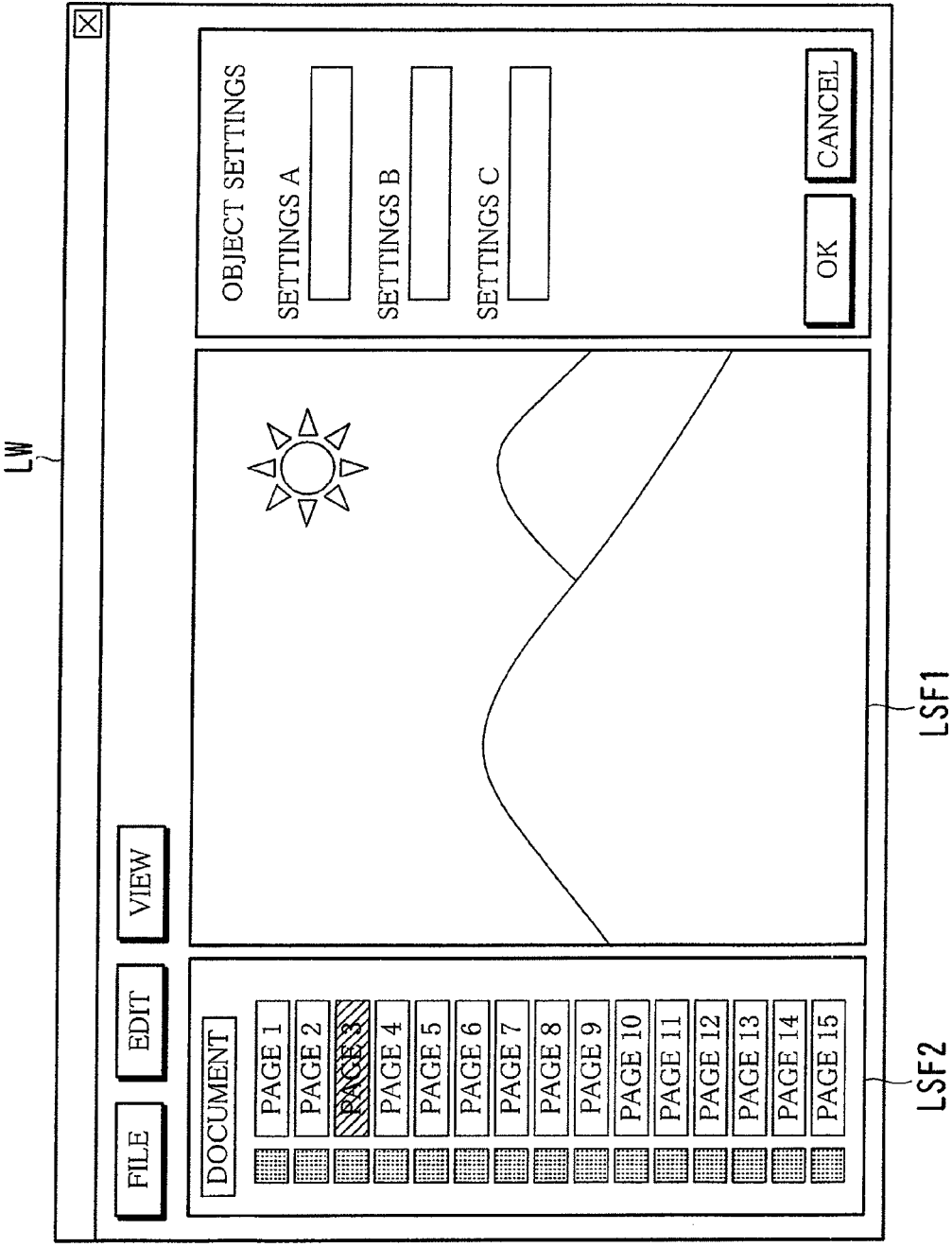

FIG. 4B

| | OBJECT TYPE |
|---|---|
| 1 | TEXT OBJECT |
| 2 | IMAGE OBJECT |
| 3 | TABLE OBJECT |
| ⋮ | ⋮ |

FIG. 4C

| | CONTENT TYPE |
|---|---|
| 1 | BODY |
| 2 | PATTERN |
| 3 | TITLE |
| 4 | LOGO |
| ⋮ | ⋮ |

HEADER/FOOTER ADDING/EDITING ☒

FONT
| FONT NAME | MS GOTHIC ▼ |
| FONT SIZE | 12 ▼ |
| COLOR | ▨ |

MARGIN
| TOP | 2.5 ⇳ | BOTTOM | 2.5 ⇳ |
| LEFT | 2.5 ⇳ | RIGHT | 2.5 ⇳ |

TEXT

HEADER LEFT           HEADER CENTER          HEADER RIGHT

FOOTER LEFT           FOOTER CENTER          FOOTER RIGHT

ADD DATE FORMAT
yyyy.mm.dd ▼
[ADD]

ADD PAGE FORMAT
PAGE. 1 ▼
[ADD]

PAGE SETTINGS
● ALL PAGES
○ PAGE SETTINGS    STARTING PAGE [  ]    ENDING PAGE [  ]
○ SELECTED PAGE

PREVIEW

[OK]  [CANCEL]

FIG. 8B

| | ITEM TYPE |
|---|---|
| 1 | PAGE NUMBER |
| 2 | DATE |
| 3 | WATERMARK |
| 4 | OTHER OBJECTS |
| ⋮ | ⋮ |

FIG. 9

SJT

| PAGE NUMBER | DETERMINATION RESULT |
|---|---|
| 1 | 6TH PATTERN |
| 2 | 1ST PATTERN |
| 3 | 6TH PATTERN |
| 4 | 2ND PATTERN |
| 5 | 3RD PATTERN |
| 6 | 6TH PATTERN |
| 7 | 4TH PATTERN |
| 8 | 6TH PATTERN |
| 9 | 6TH PATTERN |
| 10 | 5TH PATTERN |
| ⋮ | ⋮ |

FIG. 21

[PAGES TO WHICH ITEM IS NOT TO BE ADDED PROPERLY]

PAGE. 3
PAGE. 7
PAGE. 12

PageList.txt

FIG. 24
RELATED ART
1601
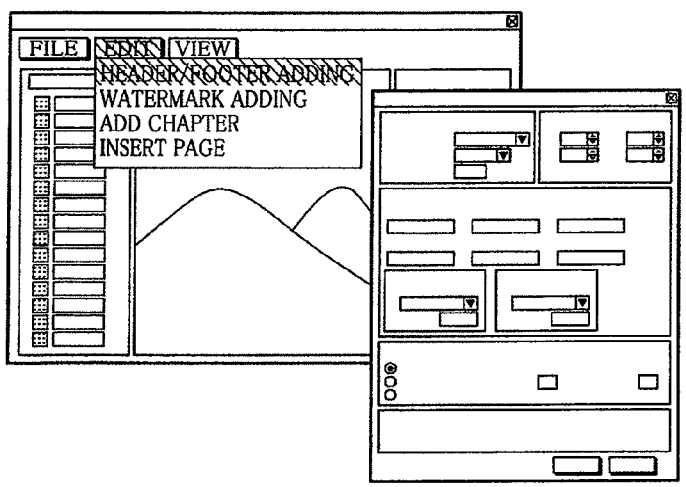
1602
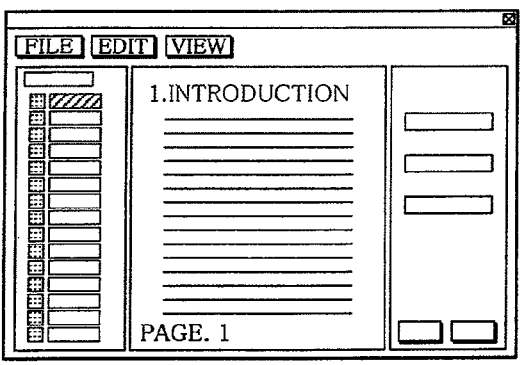
1604
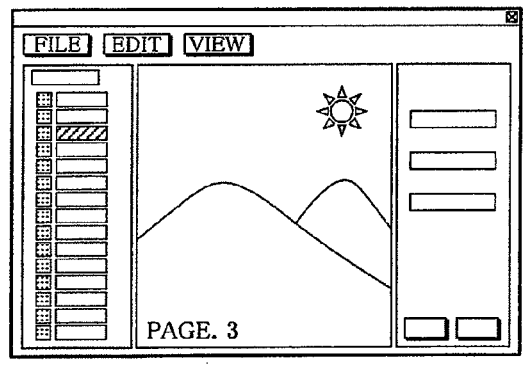
1603
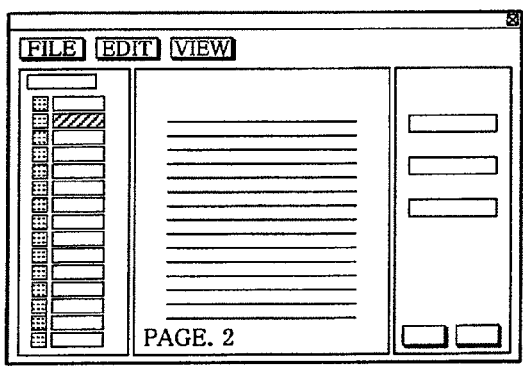
1605
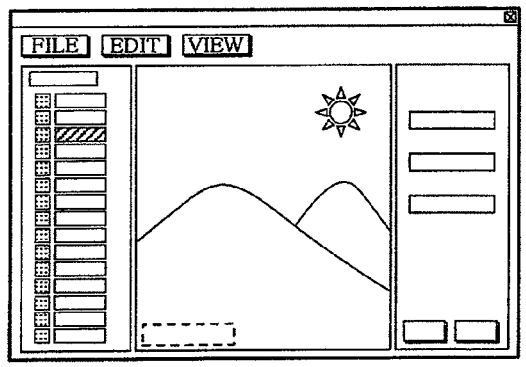

APPARATUS AND METHOD FOR EDITING DOCUMENT, AND COMPUTER-READABLE STORAGE MEDIUM FOR COMPUTER PROGRAM FOR EDITING DOCUMENT

This application is based on Japanese patent application No. 2009-192563 filed on Aug. 21, 2009, the contents of which are hereby incorporated by reference.

BACKGROUND OF THE INVENTION

1. Field of the Invention

The present invention relates to a document editing apparatus for adding a page number, a watermark, a date, or the like to a document.

2. Description of the Related Art

In recent years, a printing technology called on-demand printing, print on demand (POD), or the like has come into widespread use. Such a printing technology is to print exactly the quantity a user needs, when he/she needs. Unlike conventional technologies in which printing is performed after a plate-making process, according to the on-demand printing, printing is performed by directly outputting digital data created by, for example, software for Desktop Publishing (DTP) to a digital printer.

Such a printing technology does not need large-scale equipment, the great number of processes, and a technical skill as compared with conventional printing technologies. Such a printing technology is advantageous in that the necessary number of printings can be easily performed for a short period of time when the need arises. Such a printing technology also has the advantage of flexibility since it enables variable data printing in which elements such as text and images are changed for each printed piece of paper.

For these reasons, not only professional printing businesses but also general businesses have recently been introducing and using an on-demand printing system employing a digital printer for the purpose of printing manuals, catalogs, or Direct Mails (DMs) on their own.

With on-demand printing, document editing software is generally used to create print data to be outputted to a digital printer. Such document editing software has a variety of functions to edit layouts and designs in a document for printing. The document editing software has a function, for example, to import document data such as text data or image data into print data, and a function to add a page number, a watermark, a date, or the like to each page in accordance with a command made by a user.

There is also provided a function to dynamically move a position at which a page number is to be added taking account of a biding position or a spreading direction of a resulting printed material (Japanese Laid-open Patent Publication No. 2007-317225).

In the meantime, it is sometimes a case where document editing software is used to add a page number, a watermark, a date, or the like (each of these elements is hereinafter referred to as a "page item") to all of pages or predetermined pages collectively. In such a case, the page item may not be added to a page properly depending on the state of content on the page. To be specific, a page item and another element constituting a content on a page such as a text, an image, or a background are positioned one above the other; thereby the page item may not be properly visible on a resulting printed material.

To cope with this, according to conventional methods, a user has viewed a layout screen to check visually whether or not page items are added properly to all the pages. Then, if finding a page to which a page item is not properly added, the user deals with the found page, e.g., prevents the page item from being displayed, or changes the position at which the page item is added to another position.

In general, only a one-page range is displayed on the layout screen. Accordingly, the user has to view the indication for each page to check whether or not a page item has been added properly to each page. For example, the user has to check each page in the following manner.

Referring to FIG. 24, the user makes settings to add page numbers to headers or footers of all the pages (#1601). Then, the user makes operation to display the first page and confirms that the page number is added thereto properly (#1602). The user, then, makes operation to display the second page and confirms that the page number is added thereto properly (#1603). Further, the user makes operation to display the third page and confirms that the page number and an image are positioned one above the other (#1604). The user here determines that it is unnecessary to display a page item, i.e., the page number, on the third page because the third page constitutes only of the image as the content, so that the user changes the settings in such a manner that the page number is not displayed on the third page (#1605). After that, the user makes operation to display the fourth page and confirms that the page number is added thereto properly. In this way, the user is required to perform operation for checking whether or not the page number is added to each page properly. The large number of pages requires a large amount of labor to perform such checking on all the pages.

Unfortunately, conventional methods have a problem that it takes a large amount of time for a user to, in particular, add page items to pages in the overall workflow for document editing.

The use of the technique disclosed in Japanese Laid-open Patent Publication No. 2007-317225 does not enable a user to correct a state in which a page item and an element such as a text, an image, or a background constituting a content are positioned one above the other. Thus, the technique disclosed in Japanese Laid-open Patent Publication No. 2007-317225 does not overcome the problem discussed above.

SUMMARY

The present disclosure is directed to solve the problems pointed out above, and therefore, an object of an embodiment of the present invention is to enable a user to quickly and easily specify a page to which a page item is not added properly.

According to an aspect of the present invention, an apparatus for editing a document containing a plurality of pages each of which includes one or more first objects is provided. The apparatus includes an adding portion that adds a second object to each of the plurality of pages, an extraction portion that extracts, from the plurality of pages, a possible improper page that is a page to which the second object is probably not added properly, the possible improper page being extracted for each cause due to which the second object is not added properly, a quantity display portion that displays, for each cause, a quantity of the possible improper page thus extracted, an excluding portion that excludes, from the possible improper page, a selected page that is a page corresponding to the cause selected by a user, and an informing portion that informs the user of a to-be-confirmed page that corresponds to the possible improper page remaining after excluding the selected page.

According to another aspect of the present invention, a computer-readable storage medium storing thereon a computer program used in an apparatus for editing a document containing a plurality of pages each of which includes one or more first objects is provided. The computer program causes the apparatus to perform an adding process of adding a second object to said each of the plurality of pages, an extraction process of extracting, from the plurality of pages, a possible improper page that is a page to which the second object is probably not added properly, the possible improper page being extracted for each cause due to which the second object is not added properly, a quantity display process of displaying, for each cause, a quantity of the possible improper page thus extracted, an excluding process of excluding, from the possible improper page, a selected page that is a page corresponding to the cause selected by a user, and an informing process of informing the user of a to-be-confirmed page that corresponds to the possible improper page remaining after excluding the selected page.

Preferably, the computer program further causes the apparatus to perform a thumbnail display process of displaying a thumbnail image of the possible improper page extracted for each cause.

Preferably, the second object is a page number, a watermark, a date, a company logo, a magazine title, or a book title.

Preferably, the cause is at least one of the following: the second object and an object corresponding to the first object whose data represents an image are placed one above the other; the second object and an object corresponding to the first object whose data represents a text are placed one above the other; a color of a text constituting the second object and a color of a background of a page on which the second object is placed are equal or similar to each other; the second object and an object corresponding to the first object whose type is a pattern are placed one above the other; and the second object and an object corresponding to the first object whose type is a title or a logo are placed one above the other.

Preferably, the informing process includes informing, by displaying, the user of the to-be-confirmed page by highlighting a page icon corresponding to the possible improper page.

Alternatively, the informing process includes informing the user of the to-be-confirmed page by generating an electronic file containing, therein, a page number of the possible improper page, and opening the electronic file through operation performed by the user.

Yet alternatively, the informing process includes informing the user of the to-be-confirmed page by displaying a pop-up containing, therein, a page number of the possible improper page.

These and other characteristics and objects of the present invention will become more apparent by the following descriptions of preferred embodiments with reference to drawings.

BRIEF DESCRIPTION OF THE DRAWINGS

FIG. 3 is a diagram illustrating an example of a layout window.

FIGS. 4A-4C are diagrams illustrating an example of the structure of a page information table constituting a part of edit data.

FIGS. 7A and 7B are diagrams illustrating examples of a page item setting dialogue.

FIGS. 8A and 8B are diagrams illustrating an example of the structure of a page item information table constituting a part of edit data.

FIG. 9 is a diagram illustrating an example of an added state determination table.

FIG. 21 is a diagram illustrating an example of an electronic file in which a plurality of page numbers are collectively written.

FIG. 24 is a diagram illustrating an example of a case in which a page item added state is confirmed by feeding pages.

DESCRIPTION OF THE PREFERRED EMBODIMENTS

An embodiment of the present invention is described below with reference to drawings.

Figure 1:
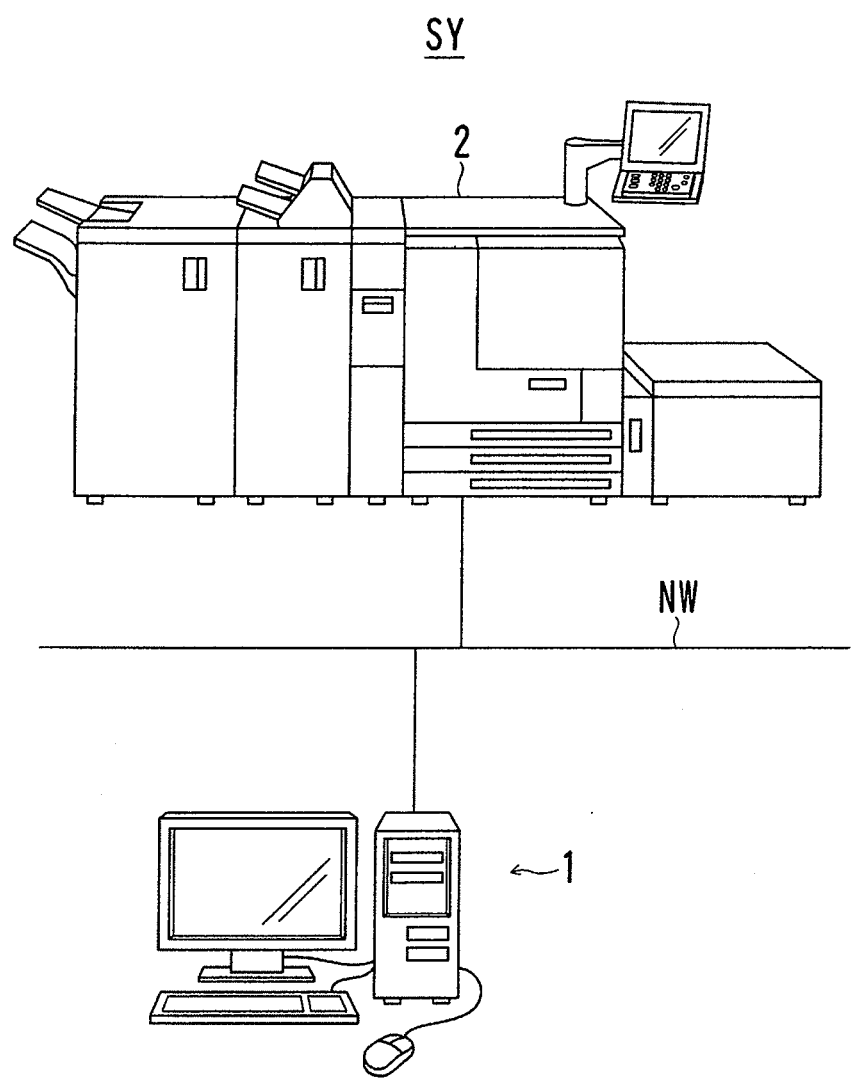
FIG. 1 is a diagram illustrating an example of the overall configuration of a DTP system.

FIG. 1 is a diagram illustrating an example of the overall configuration of a DTP system SY.

Referring to FIG. 1, the DTP system SY is configured of a document editing apparatus 1 and a printer 2 that are connected to each other via a network NW. Another information processing apparatus may be connected to the network NW.

The network NW is established by, for example, a Local Area Network (LAN), and Transmission Control Protocol/Internet Protocol (TCP/IP) or another protocol is used as the communication protocol. The network NW may be connectable to the Internet via a gateway or the like.

This embodiment describes an example of a DTP system SY installed in a printing company that receives a document from a client and undertakes to edit and print the document.

The document editing apparatus 1 is a device having a function to edit layouts and designs in the document for printing, and a function to send/receive data via the network.

In this embodiment, the document editing apparatus 1 is used, in particular, to import draft data DD received from the client, and to create edit data ED in which layouts and designs in the document are edited based on the draft data DD for printing. The document editing apparatus 1 is also used to convert the edit data ED thus created into print data PD that can be analyzed by the printer 2, and to send the print data PD to the printer 2.

An example of the document editing apparatus 1 is a general-purpose computer including a Central Processing Unit (CPU), a Random Access Memory (RAM), a Read-Only Memory (ROM), a storage, a display, a keyboard, a pointing device, and a network interface.

The printer 2 is a device that is accessible from an information processing apparatus connected to the network NW, and has a so-called network printing function. The printer 2 may be an image processing apparatus called a "multifunction device" or a "Multi Function Peripheral (MFP)" that has not only the printing function but also a variety of functions, such as copying, scanning, faxing, and a document server function. In this embodiment, the printer 2 is used, in particular, to print, onto paper, an image based on the print data PD sent by the document editing apparatus 1. The printer 2 is also used to perform finishing such as stapling, folding, or binding on a printed matter as necessary.

First Embodiment

Figure 2:
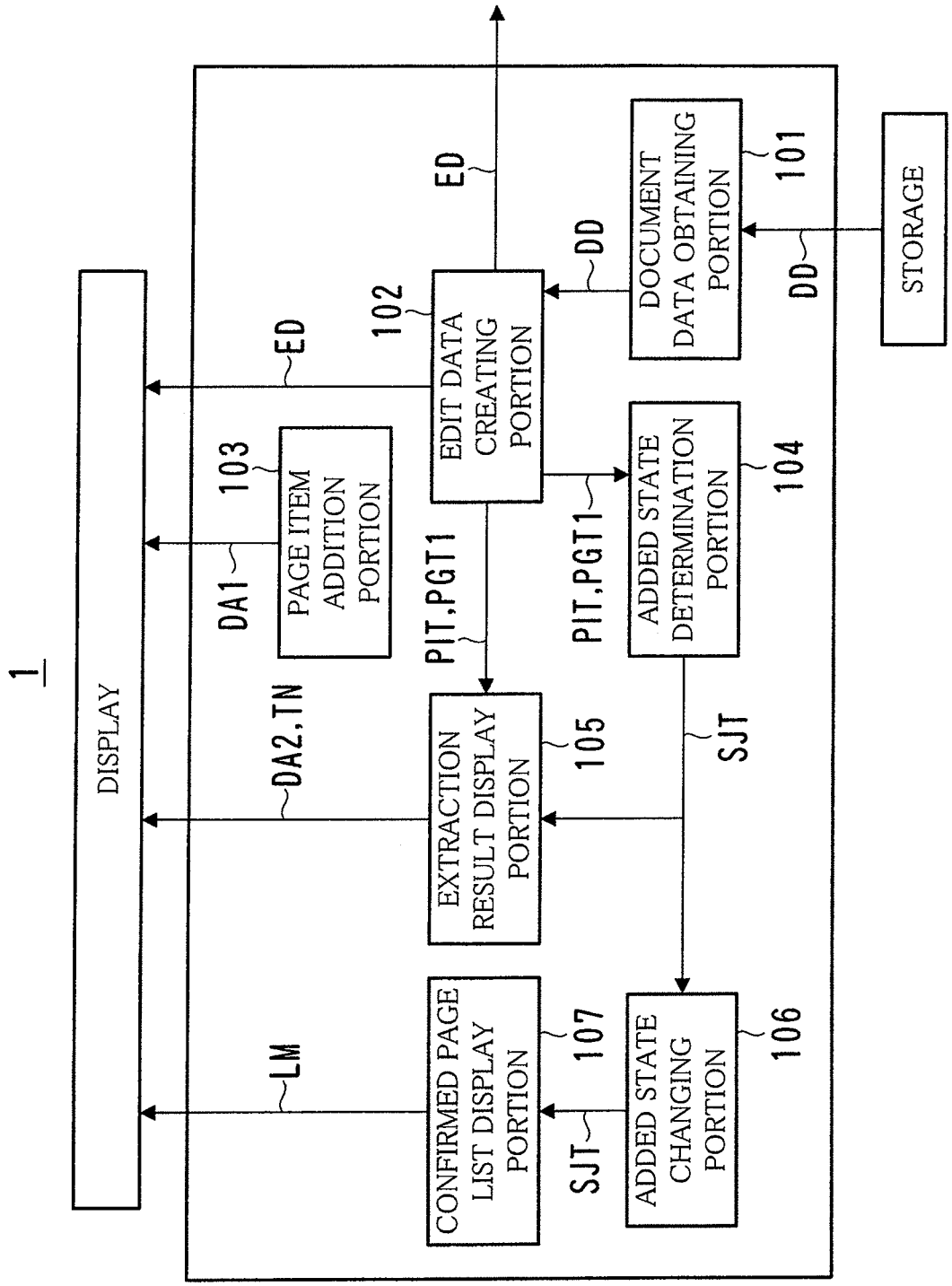
FIG. 2 is a diagram illustrating an example of the functional configuration of a document editing apparatus.
Figure 4A:
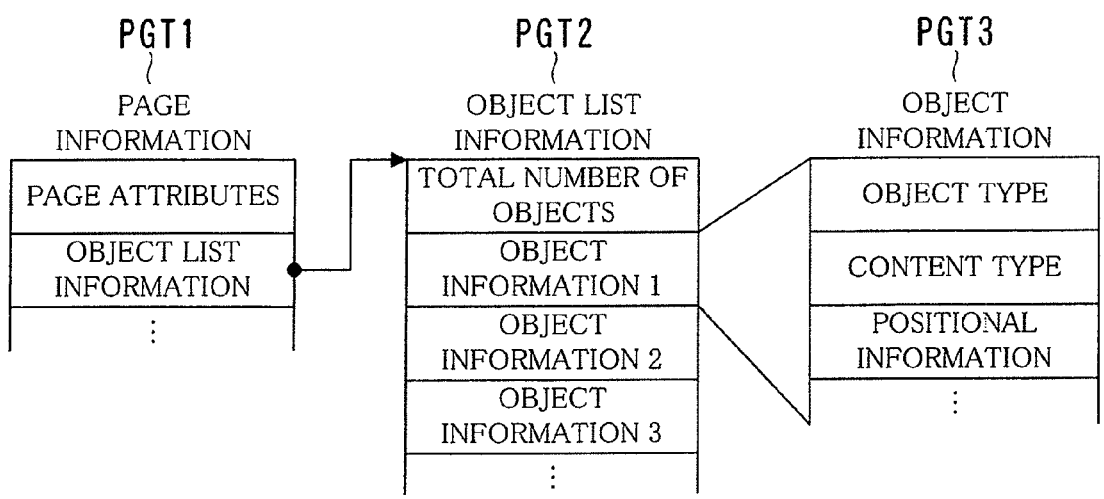
Figure 5:
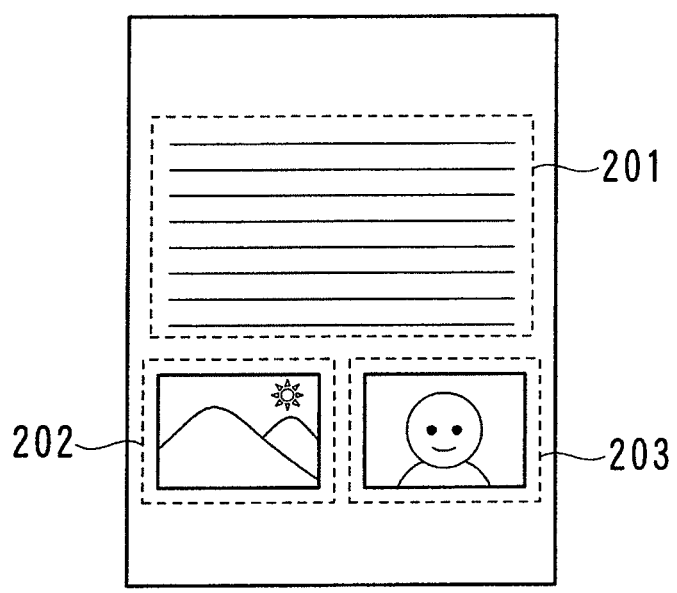
FIG. 5 is a diagram illustrating an example of a page contained in draft data.
Figure 6A:
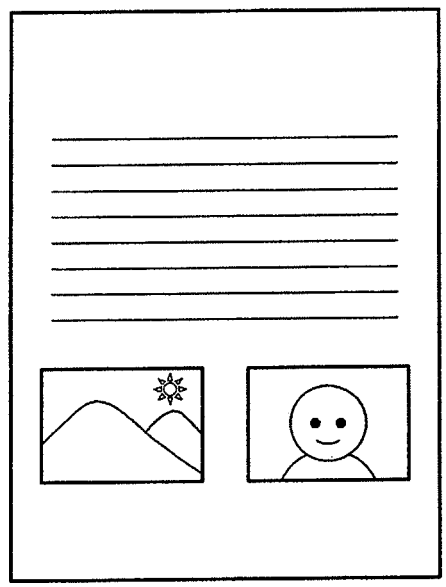
FIGS. 6A-6D are diagrams illustrating an example of the transition of a page displayed in a page frame.
Figure 6B:
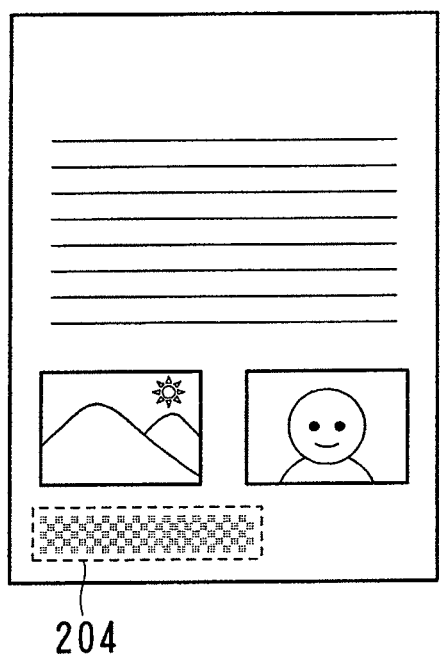
Figure 6C:
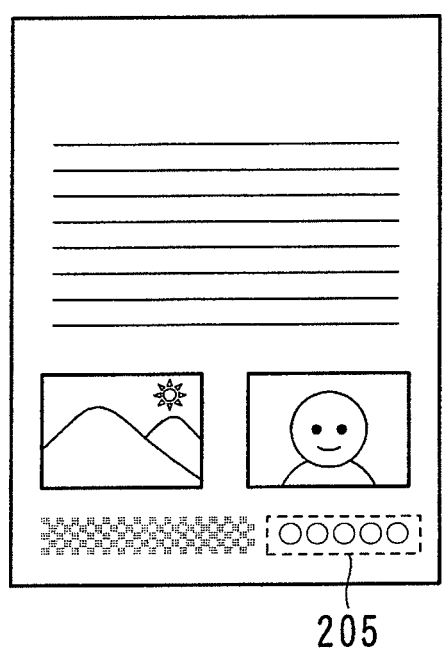
Figure 6D:
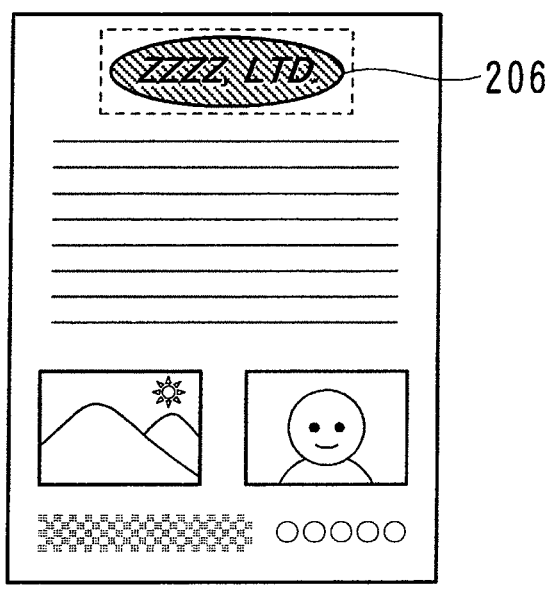
Figure 7B:
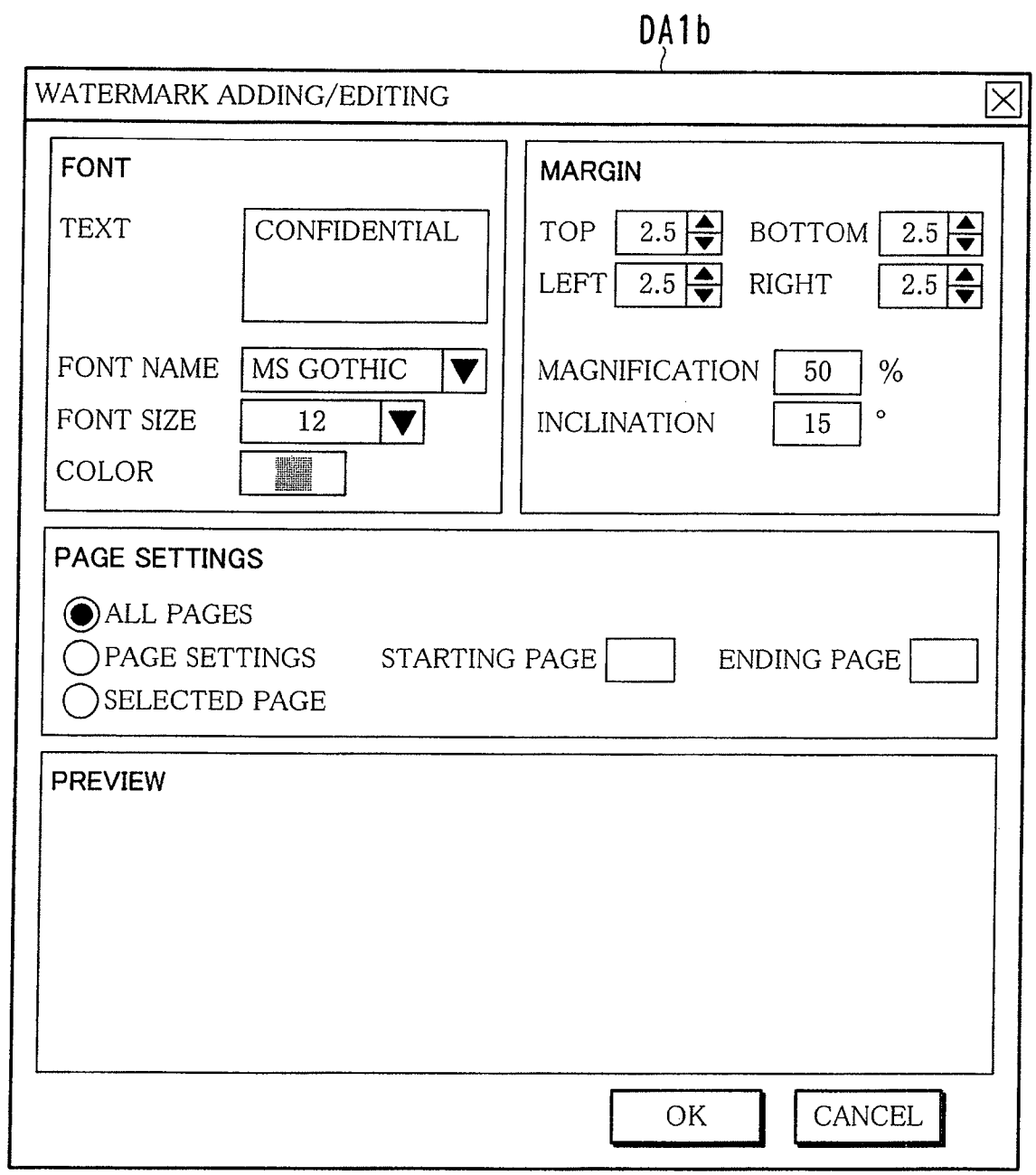
Figure 8A:
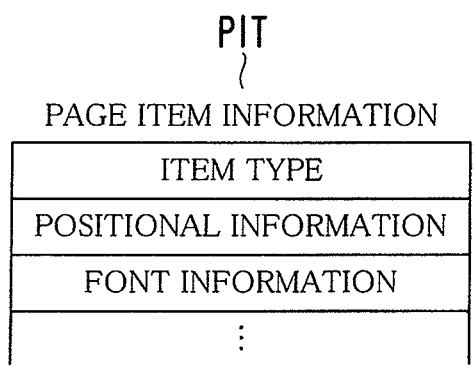
Figure 11:
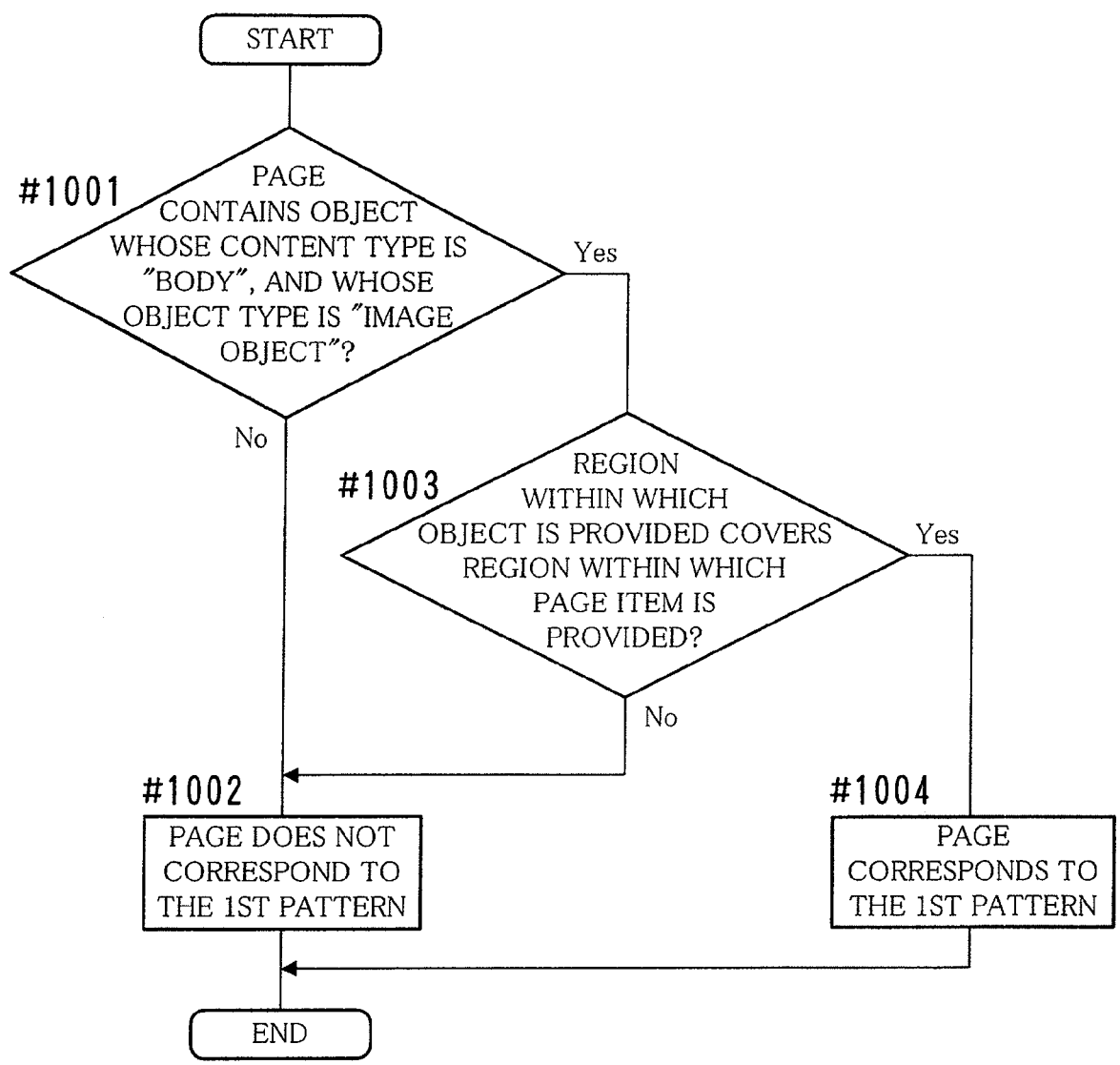
FIG. 11 is a flowchart illustrating an example of the flow of a first pattern determination process.
Figure 12:
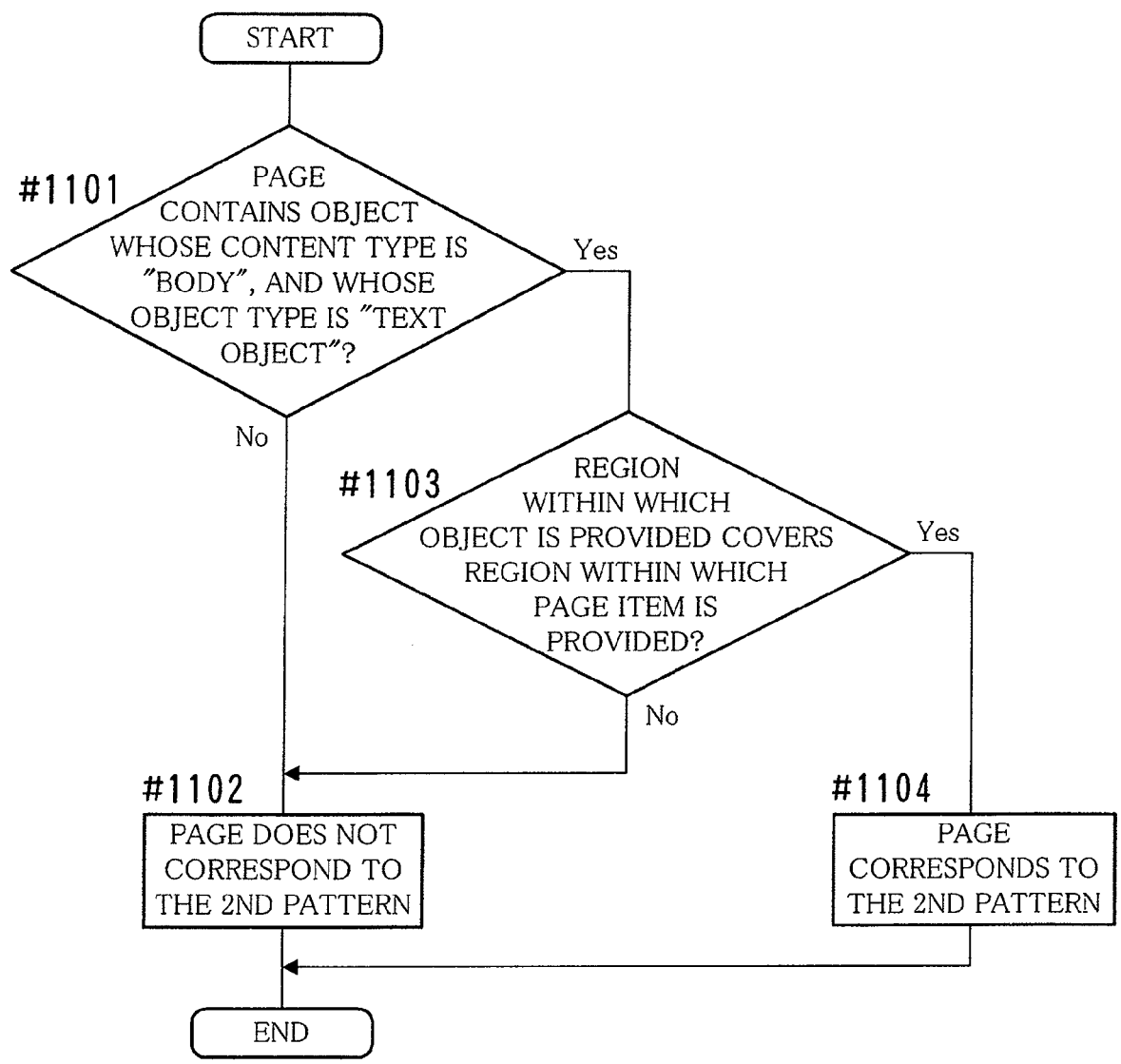
FIG. 12 is a flowchart illustrating an example of the flow of a second pattern determination process.
Figure 13:
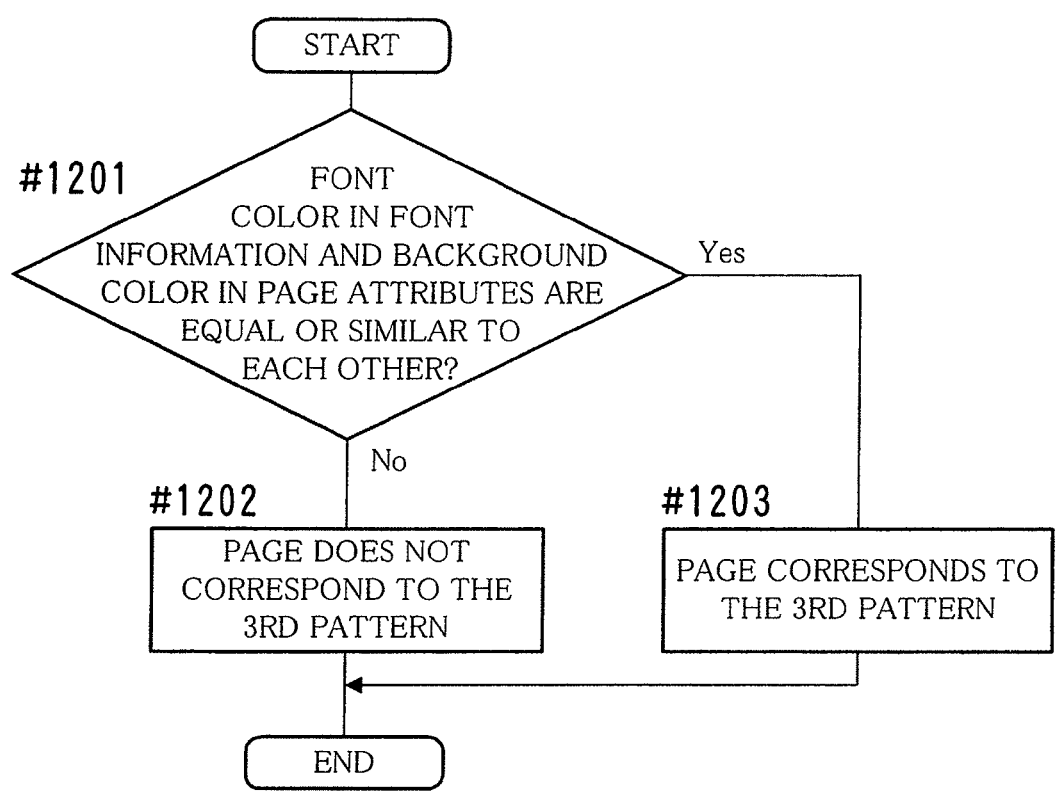
FIG. 13 is a flowchart illustrating an example of the flow of a third pattern determination process.
Figure 14:
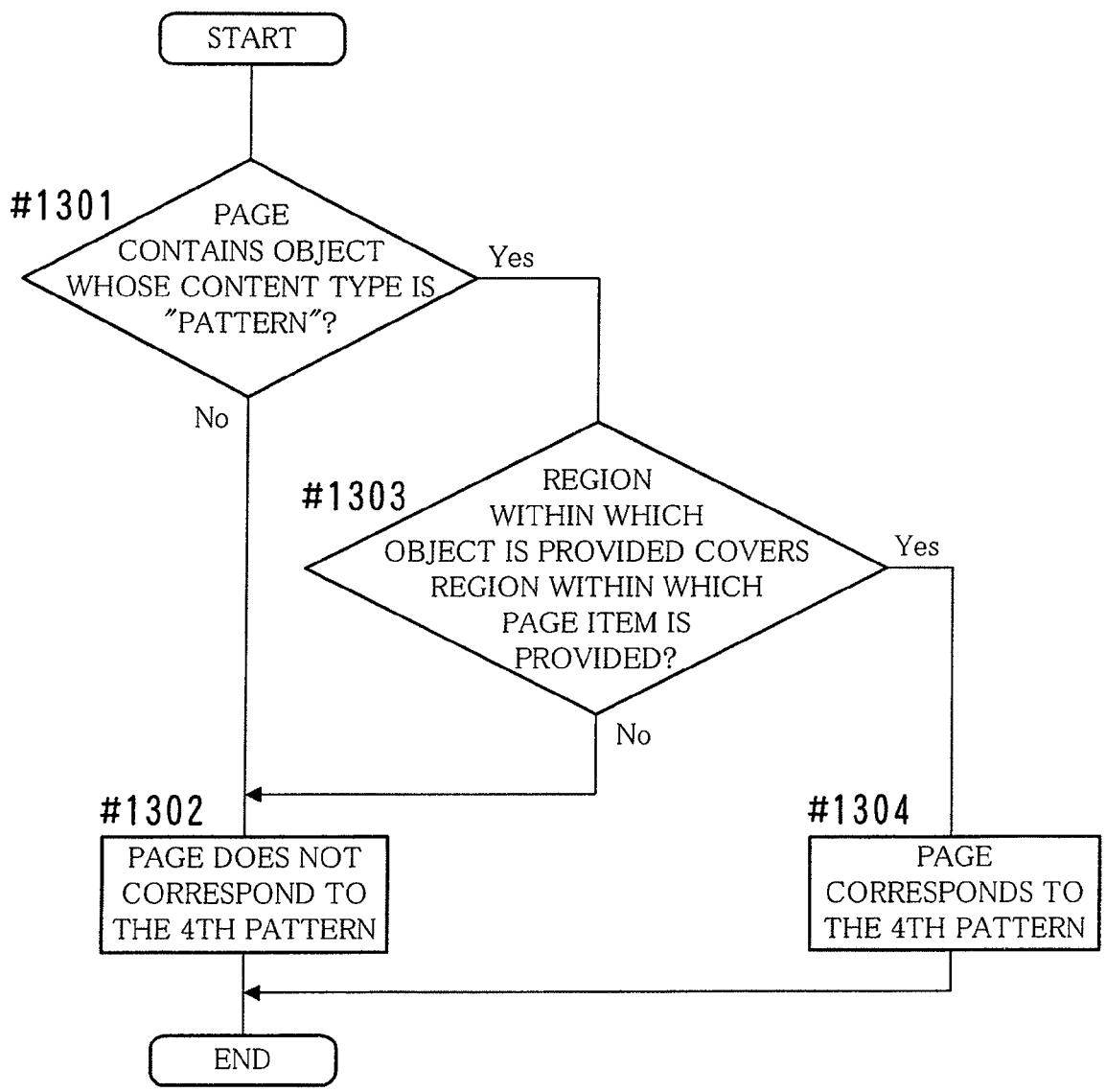
FIG. 14 is a flowchart illustrating an example of the flow of a fourth pattern determination process.
Figure 15:
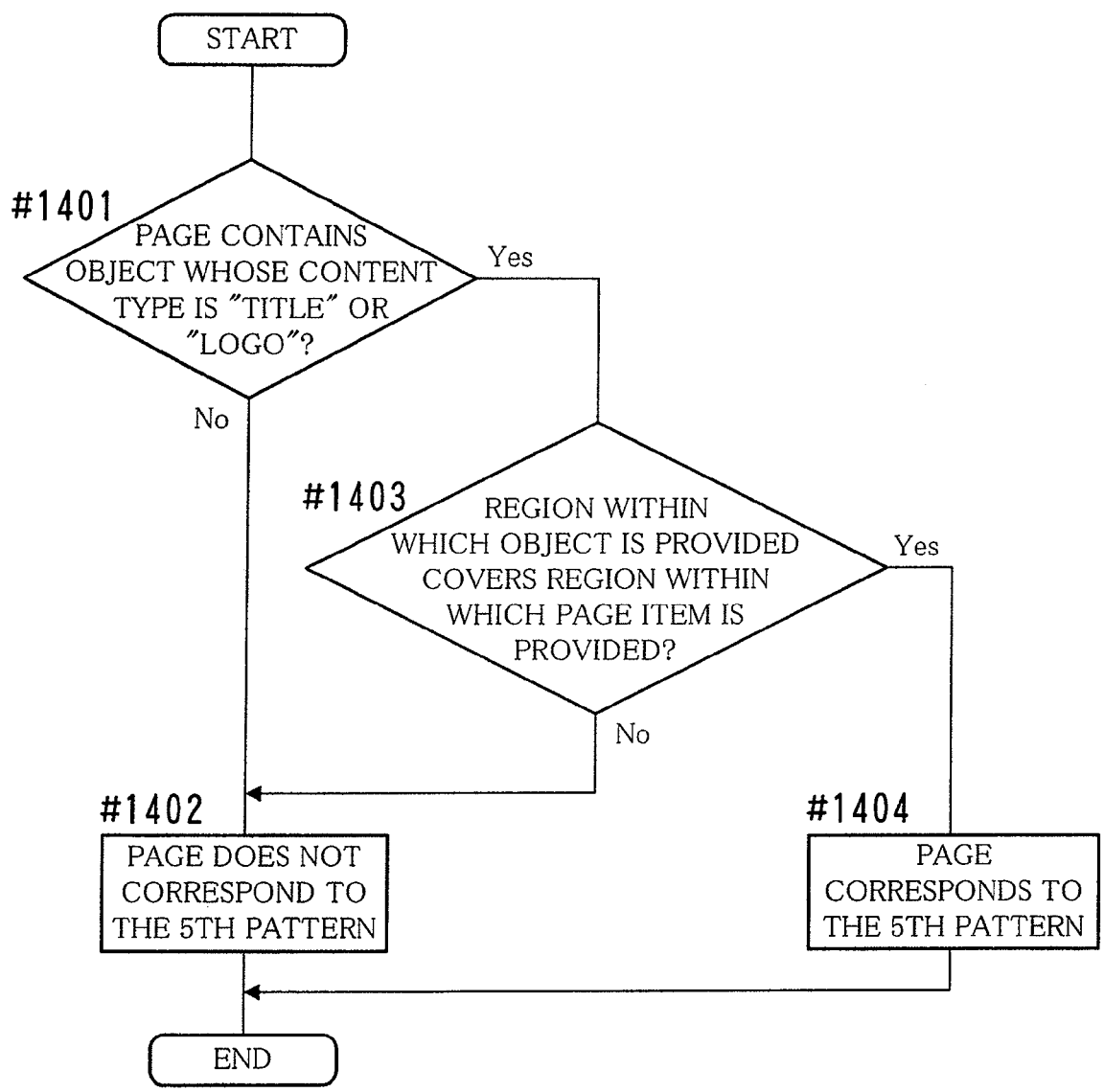
FIG. 15 is a flowchart illustrating an example of the flow of a fifth pattern determination process.
Figure 16A:
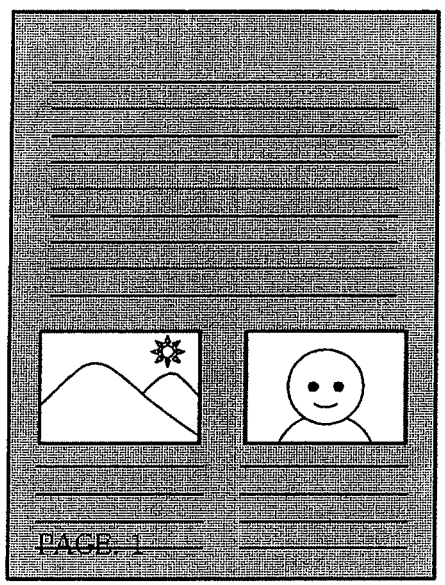
FIGS. 16A and 16B are diagrams illustrating examples of a case in which a state of content on a page corresponds to a plurality of patterns redundantly.
Figure 16B:
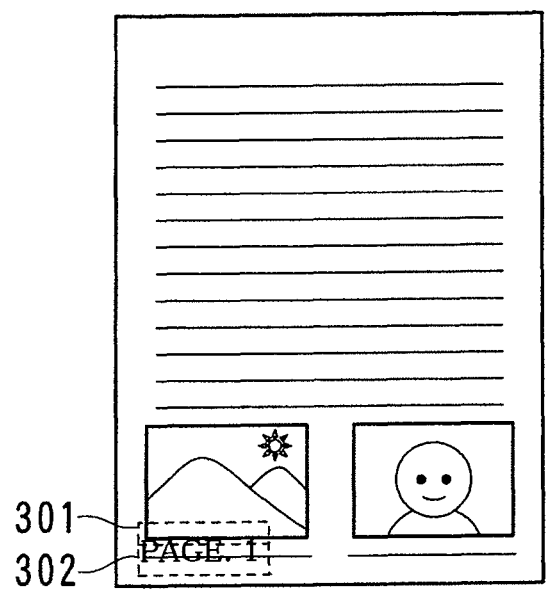
Figure 17:
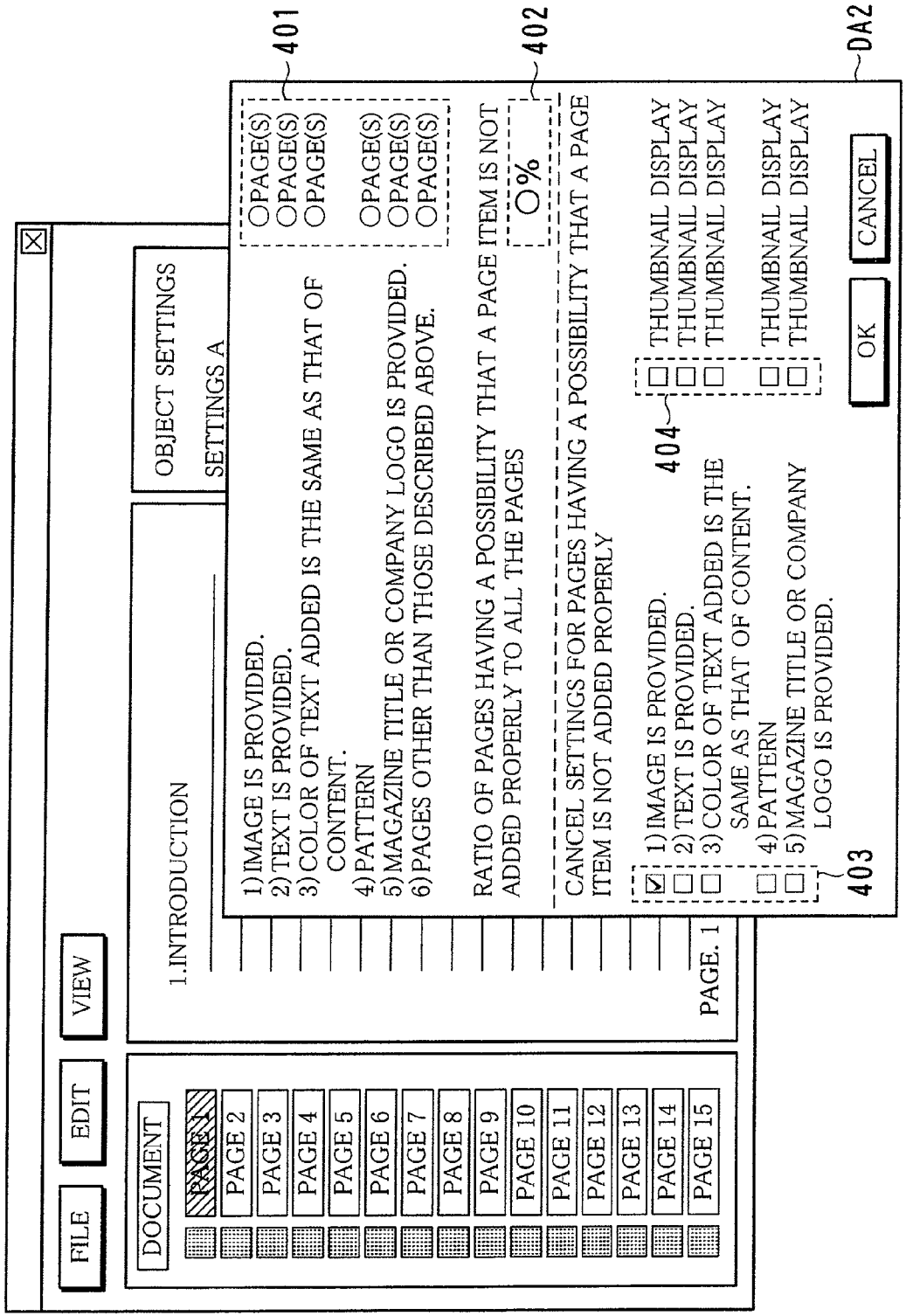
FIG. 17 is a diagram illustrating an example of an extraction result display dialogue.
Figure 18:
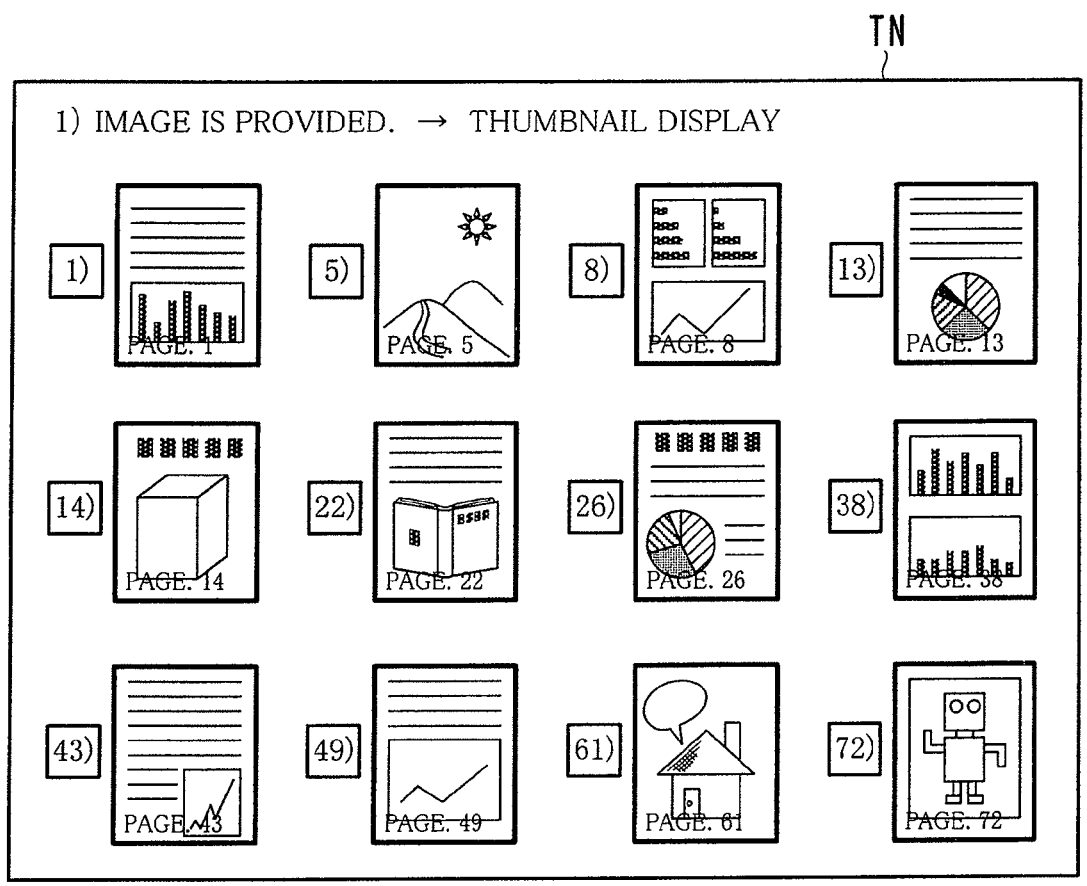
FIG. 18 is a diagram illustrating an example of a corresponding page list of thumbnail images of pages corresponding to a pattern.
Figure 19:
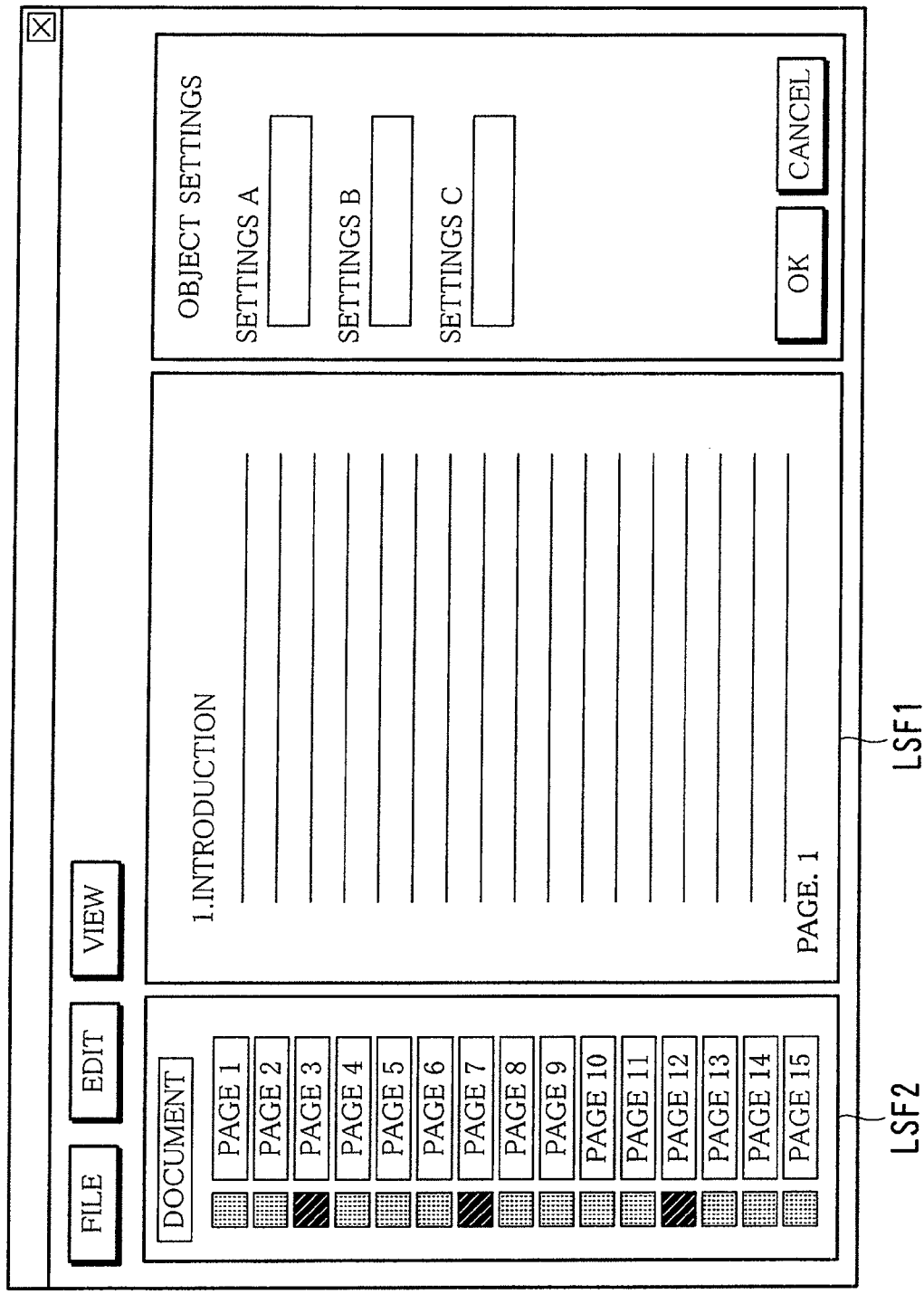
FIG. 19 is a diagram illustrating an example of indication in which page icons are highlighted.
Figure 20:
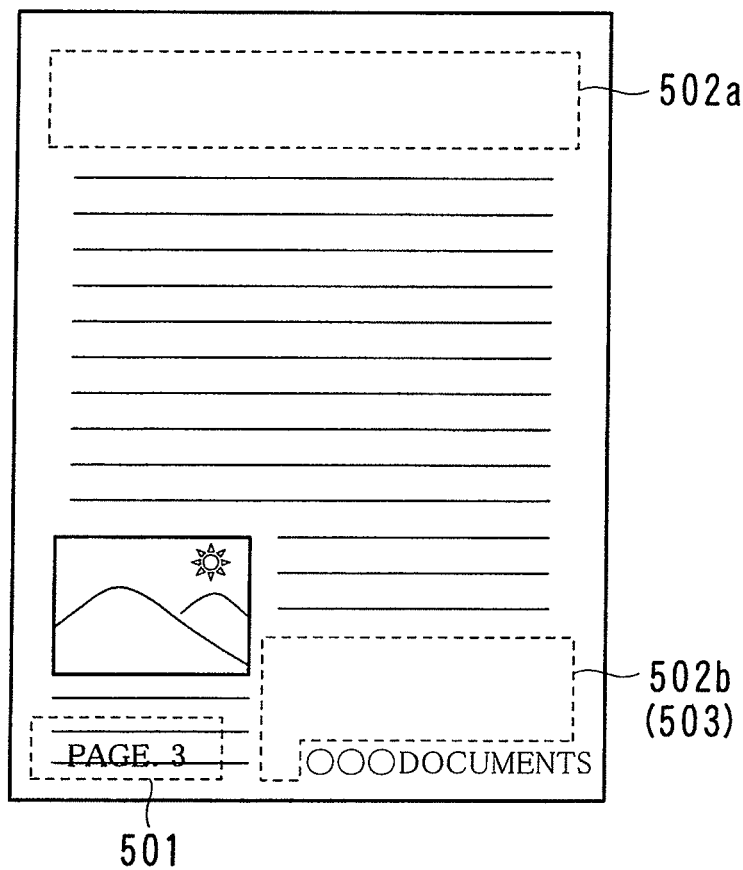
FIG. 20 is a diagram illustrating an example of a state of content on a page to which a page item is added.

FIG. 2 is a diagram illustrating an example of the functional configuration of the document editing apparatus 1; FIG. 3 is a diagram illustrating an example of a layout window LW; FIGS. 4A-4C are diagrams illustrating an example of the structure of a page information table PGT1 constituting a part of edit data ED; FIG. 5 is a diagram illustrating an example of a page contained in draft data DD; FIGS. 6A-6D are diagrams illustrating an example of the transition of a page displayed in a page frame LSF1; FIGS. 7A and 7B are diagrams illustrating examples of a page item setting dialogue DA1; FIGS. 8A and 8B are diagrams illustrating an example of the structure of a page item information table PIT constituting a part of edit data ED; FIG. 9 is a diagram illustrating an example of an added state determination table SJT; FIGS. 10A-10F are diagrams illustrating examples of a pattern of a state of content on a page; FIG. 11 is a flowchart illustrating an example of the flow of a first pattern determination process; FIG. 12 is a flowchart illustrating an example of the flow of a second pattern determination process; FIG. 13 is a flowchart illustrating an example of the flow of a third pattern determination process; FIG. 14 is a flowchart illustrating an example of the flow of a fourth pattern determination process; FIG. 15 is a flowchart illustrating an example of the flow of a fifth pattern determination process; FIGS. 16A and 16B are diagrams illustrating examples of a case in which a state of content on a page corresponds to a plurality of patterns redundantly; FIG. 17 is a diagram illustrating an example of an extraction result display dialogue DA2; FIG. 18 is a diagram illustrating an example of a corresponding page list TN of thumbnail images of pages corresponding to a pattern; FIG. 19 is a diagram illustrating an example of indication in which page icons are highlighted; and FIG. 20 is a diagram illustrating an example of a state of content on a page to which a page item is added.

Referring to FIG. 2, the storage of the document editing apparatus 1 stores, therein, programs for implementing functions of a document data obtaining portion 101, an edit data creating portion 102, a page item addition portion 103, an added state determination portion 104, an extraction result display portion 105, an added state changing portion 106, a confirmed page list display portion 107, and the like. These programs are loaded into the RAM by the CPU, and executed by the CPU.

The following is a description of the details of processing performed by the individual portions in the order in which an editor user who is in charge of editing a document performs operation on the document editing apparatus 1.

Suppose that, for example, a client submits draft data DD containing data for a plurality of pages, e.g., 100 to 300 pages, to a printing company in which the DTP system 1 shown in FIG. 1 is installed. Staff of the printing company performs predetermined editing operation based on the draft data DD to create edit data ED. The staff, then, uses the printer 2 to perform printing based on the details of the edit data ED. Here, the predetermined editing operation includes editing to be performed for each page and editing to be collectively performed on all the pages. The former is specifically editing to add a pattern, a magazine title, and a company logo to a predetermined page. The latter is specifically editing to add an object such as a page number, a watermark, or a date, or the other objects to all the pages collectively. Hereinafter, each of the objects to be added through the latter editing operation is referred to as a "page item". Further, suppose that the client requests the printing company to add such page items to all the pages, and to check, before printing, whether or not the page items are added thereto properly.

The storage of the document editing apparatus 1 stores, therein, the draft data DD submitted by the client. The draft data DD is a file created by using document preparation software, image editing software, or the like. The draft data DD is, for example, a Portable Document Format (PDF) file or a Tagged Image File Format (TIFF) file.

The editor user edits the document while viewing the layout window LW shown in the screen of the display of the document editing apparatus 1 as illustrated in FIG. 3. The layout window LW includes a page frame LSF1 and a page list map frame LSF2. The page frame LSF1 shows a display of any one of the individual pages to be edited. The page list map frame LSF2 shows a list of page icons specifying the individual pages to be edited. The editor user selects any one of the page icons in the page list map frame LSF2, so that the page identified by the selected page icon is displayed in the page frame LSF1.

The first embodiment describes an example in which, when the editor user performs operation to add page items to all the pages, a page icon corresponding to a page to which the page item may not be added properly is highlighted among the page icons in the page list map frame LSF2, and thereby the editor user is prompted to confirm the page corresponding to the highlighted page icon.

First, the editor user operates the document editing apparatus 1 to specify the draft data DD to be edited.

Then, the document data obtaining portion 101 shown in FIG. 2 obtains the draft data DD specified by the editor user from the storage, and conveys the draft data DD to the edit data creating portion 102.

The edit data creating portion 102 creates the page information table PGT1 as shown in FIG. 4A for each page contained in the draft data DD, and manages information on the page. In essence, the edit data creating portion 102 creates the page information tables PGT1 whose quantity corresponds to the number of pages contained in the draft data DD. Each of the page information tables PGT1 constitutes a part of the edit data ED.

The following is a description of the structure of the page information table PGT1.

The page information table PGT1 includes page attributes and object list information PGT2. The page attributes are information on attributes of the page, such as setting of a header/footer display/non-display flag and a setting value of the background color of the page. The setting value of the background color is a value represented in Red-Green-Blue (RGB) format, Cyan-Magenta-Yellow-Black (CMYK) format, or the like.

The object list information PGT2 includes the total number of objects and object information PGT3 whose amount corresponds to the number of objects. The total number of objects is the sum total of the objects contained in the page. The object herein is a structural element of the content of the page, i.e., a text or an image contained in the page. The page item, however, is not included in the objects managed in the object list information PGT2.

The object information PGT3 includes an object type, a content type, and positional information.

As shown in FIG. 4B, the object type of the object information PGT3 indicates a type of data format of an object such as a "text object", an "image object", or a "table object".

As shown in FIG. 4C, the content type of the object information PGT3 indicates a kind of an object such as a "body", a "pattern", a "title", or a "logo". The "body" represents an object introduced from the draft data DD. The "pattern", the "title", and the "logo" represent objects that are not introduced from the draft data DD but added later as the pattern, the title, and the logo respectively in the document editing apparatus 1.

The positional information of the object information PGT3 indicates a value showing the position on the page at which the object is placed. The positional information is, for example, a value showing X and Y coordinates of the upper left corner and X and Y coordinates of the lower right corner of a rectangular region within which the object is placed. Alternatively, the positional information is, for example, a value showing X and Y coordinates of the lower left corner of a rectangular region within which the object is placed, the width and the height of the rectangular region.

Meanwhile, the edit data creating portion 102 shown in FIG. 2 analyzes information on the individual pages contained in the draft data DD, and registers, as the individual objects, one or more structural elements of a content on the page in the object list information PGT2.

Suppose that, for example, the draft data DD contains a page, as shown in FIG. 5, including a region 201 within which a text is provided, a region 202 within which an image is provided, and a region 203 within which another image is provided. In such a case, the edit data creating portion 102 registers these elements provided in the regions 201-203, as the individual objects, in the object list information PGT2 of the page information table PGT1 for the page. At this time, the edit data creating portion 102 sets a "text object" as the object type in the object information PGT3 for the region 201. The edit data creating portion 102 also sets a "body" as the content type therein, and sets a value showing the position of the region 201 on the page as the positional information. As with this, the edit data creating portion 102 sets an "image object" as the object type in the object information PGT3 for the region 202. The edit data creating portion 102 also sets a "body" as the content type therein, and sets a value showing the position of the region 202 on the page as the positional information. Likewise, the edit data creating portion 102 sets an "image object" as the object type in the object information PGT3 for the region 203. The edit data creating portion 102 also sets a "body" as the content type therein, and sets a value showing the position of the region 203 on the page as the positional information.

The edit data creating portion 102 displays, in the page frame LSF1, the details of the individual pages obtained by importing the draft data DD as is in accordance with the page information table PGT1 created as discussed above. The edit data creating portion 102 displays, for example, the page as shown in FIG. 6A in the page frame LSF1.

Subsequently, the editor user confirms the details of each page displayed in the page frame LSF1. The editor user also instructs, in accordance with the order from the client, the document editing apparatus 1 to add a predetermined pattern to a predetermined position on a predetermined page.

Upon receiving the instructions from the editor user, the edit data creating portion 102 registers, as an object, the predetermined pattern in the object list information PGT2 of the page information table PGT1 for the predetermined page. At this time, the edit data creating portion 102 sets, as the object type, a "text object" or an "image object" in the object information PGT3. The edit data creating portion 102 sets a "pattern" as the content type therein. The edit data creating portion 102 also sets, as the positional information, a value indicating the position in the page at which the predetermined pattern should be placed. After that, the edit data creating portion 102 displays the details of the page to which the predetermined pattern has been added in the page frame LSF1. For example, the edit data creating portion 102 displays, in the page frame LSF1, a page to which the predetermined pattern has been added as shown in FIG. 6B.

Then, the editor user views the indication in the page frame LSF1 to confirm that the predetermined pattern has been added to the predetermined position of the predetermined page. The editor user further instructs, in accordance with the order from the client, the document editing apparatus 1 to add a magazine title to a predetermined position on a predetermined page.

Upon receiving the instructions from the editor user, the edit data creating portion 102 registers, as an object, the magazine title in the object list information PGT2 of the page information table PGT1 for the predetermined page. At this time, the edit data creating portion 102 sets, as the object type, a type depending on the data format, e.g., a "text object" or an "image object" in the object information PGT3. The edit data creating portion 102 sets a "title" as the content type therein. The edit data creating portion 102 also sets, as the positional information, a value indicating the position in the page at which the title should be placed. After that, the edit data creating portion 102 displays the details of the page to which the title has been added in the page frame LSF1. For example, the edit data creating portion 102 displays, in the page frame LSF1, a page to which the magazine title has been added as shown in FIG. 6C.

Next, the editor user views the indication in the page frame LSF1 to confirm that the magazine title has been added to the predetermined position of the predetermined page. The editor user further instructs, in accordance with the order from the client, the document editing apparatus 1 to add a company logo to a predetermined position on a predetermined page.

Upon receiving the instructions from the editor user, the edit data creating portion 102 registers, as an object, the company logo in the object list information PGT2 of the page information table PGT1 for the predetermined page. At this time, the edit data creating portion 102 sets, as the object type, a type depending on the data format, e.g., a "text object" or an "image object" in the object information PGT3. The edit data creating portion 102 sets a "logo" as the content type therein. The edit data creating portion 102 also sets, as the positional information, a value indicating the position in the page at which the logo should be placed. After that, the edit data creating portion 102 displays the details of the page to which the logo has been added in the page frame LSF1. For example, the edit data creating portion 102 displays, in the page frame LSF1, a page to which the company logo has been added as shown in FIG. 6D.

Next, the editor user views the indication in the page frame LSF1 to confirm that the company logo has been added to the predetermined position of the predetermined page. The editor user further instructs, in accordance with the order from the client, the document editing apparatus 1 to change the background color of a predetermined page to a predetermined color.

Upon receiving the instructions from the editor user, the edit data creating portion 102 sets a value indicating the predetermined color as the setting value of the background color in the page attributes of the page information table PGT1 for the predetermined page.

Subsequently, the editor user selects a function to add a page item among page items such as a page number, a watermark, a date, or other objects. If the editor user intends to add a page number or a date, then he/she selects a "header/footer adding/editing" function. If the editor user intends to add a watermark, then he/she selects a "watermark adding/editing" function.

Responding to the selection made by the editor user, the page item addition portion 103 displays, on the screen of the display of the document editing apparatus 1, the page item setting dialogue DA1 through which setting for adding the page item selected by the editor user is made. In the case where, for example, the editor user selects the "header/footer adding/editing" function, the page item addition portion 103 displays a page item setting dialogue DA1a as that shown in FIG. 7A. Alternatively, in the case where, for example, the editor user selects the "watermark adding/editing" function, the page item addition portion 103 displays a page item setting dialogue DA1b as that shown in FIG. 7B.

Next, the editor user enters, in the page item setting dialogue DA1, setting values necessary to add a page item to all the pages, and presses an "OK" button. The setting values necessary to add a page item are, for example, setting values for a font used in a text constituting the page item or setting values for the position at which the page item should be added.

The edit data creating portion 102 creates, based on the setting values entered by the editor user, the page item information table PIT as shown in FIG. 8A. The page item information table PIT constitutes a part of the edit data ED.

The following is a description of the structure of the page item information table PIT.

The page item information table PIT includes an item type, positional information, and font information.

As shown in FIG. 8B, the item type of the page item information table PIT indicates a type of a page item such as a "page number", a "date", a "watermark", or "other objects". The "watermark" is a text object corresponding to a recognizable image or pattern in paper that appears as various shades of lightness/darkness when viewed by transmitted light. The "other objects" are objects other than the page number, the date, and the watermark. The "other objects" are, for example, an image object such as a company logo, and a text object such as a magazine title.

The positional information of the page item information table PIT indicates a value showing the position on the page at which the page item is placed. The positional information is, for example, a value showing X and Y coordinates of the upper left corner and X and Y coordinates of the lower right corner of a rectangular region within which the page item is placed. Alternatively, the positional information is, for example, a value showing X and Y coordinates of the lower left corner of a rectangular region within which the page item is placed, the width and the height of the rectangular region.

The font information of the page item information table PIT indicates information concerning a font used in a text constituting the page item, and is, for example, a font type, a font size, and a font color (a value represented in RGB or CMYK format).

Meanwhile, the edit data creating portion 102 shown in FIG. 2 sets, as the item type of the page item information table PIT, a type based on the page item selected by the editor user. The edit data creating portion 102 also sets, as the positional information of the page item information table PIT, a value based on the setting value entered by the editor user and concerning the position at which the page item should be added. The edit data creating portion 102 also sets, as the font information, a value based on the setting value entered by the editor user and concerning the font used in the text constituting the page item. The edit data creating portion 102 further sets the header/footer display/non-display flag in the page attributes of the page information table PGT1 for all the pages to indicate "display". Then, the edit data creating portion 102 displays, in the page frame LSF1, the details of the page to which the page item has been added.

The edit data creating portion 102 conveys, to the added state determination portion 104, the page item information table PIT created as discussed above and the updated page information tables PGT1 for all the pages.

Upon receiving the page item information table PIT and the updated page information tables PGT1 for all the pages, the added state determination portion 104 detects a page to which a page item may not be added properly, and creates the added state determination table SJT as illustrated in FIG. 9.

To be specific, the added state determination portion 104 determines, for each page, whether or not the state of content on the page corresponds to any of five patterns that are illustrated in FIGS. 10A to 10E and may cause the situation in which a page item is not added properly. The added state determination portion 104 thereby detects a page to which the page item may not be added properly, and determines the cause thereof.

Figure 10A:
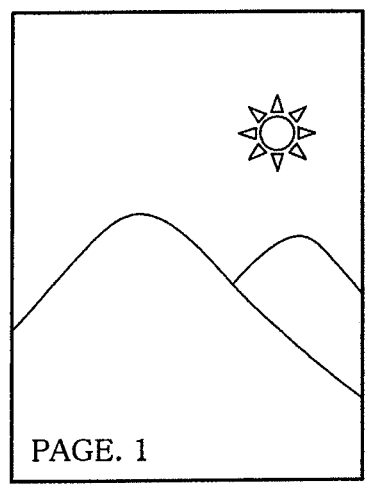
FIGS. 10A-10F are diagrams illustrating examples of a pattern of a state of content on a page.

As shown in FIG. 10A, the first pattern corresponds to a state in which a page item and an image imported from the draft data DD are positioned one above the other.

Figure 10B:
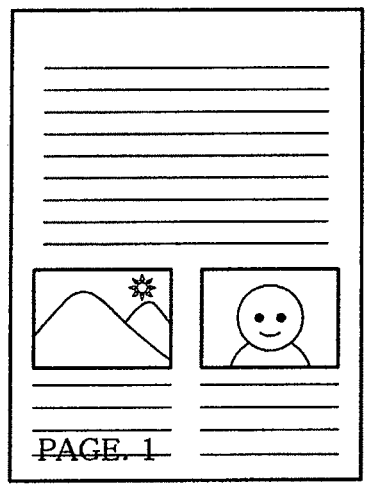

As shown in FIG. 10B, the second pattern corresponds to a state in which a page item and a text imported from the draft data DD are positioned one above the other.

Figure 10C:
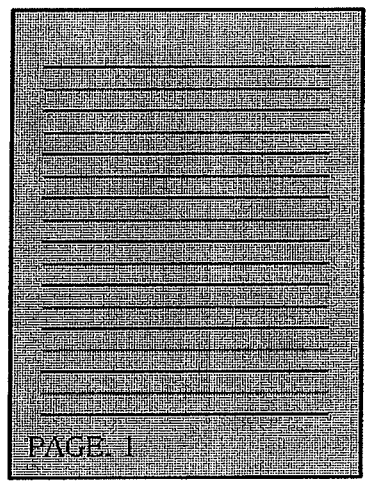

As shown in FIG. 10C, the third pattern corresponds to a state in which the color of a text constituting the page item is the same as or similar to the background color of the page.

Figure 10D:
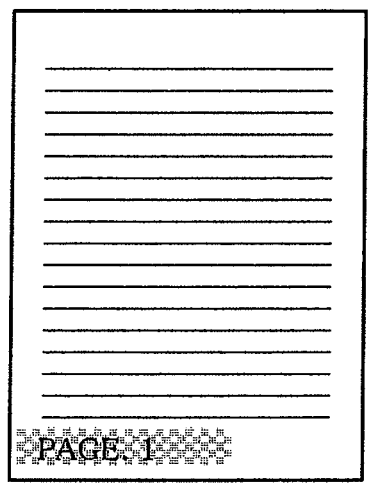

As shown in FIG. 10D, the fourth pattern corresponds to a state in which a page item and a pattern added to the page are positioned one above the other.

Figure 10E:
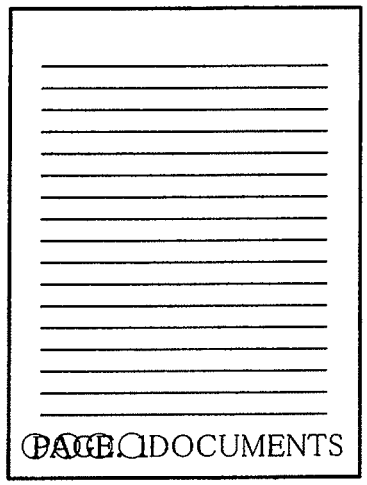
Figure 10F:
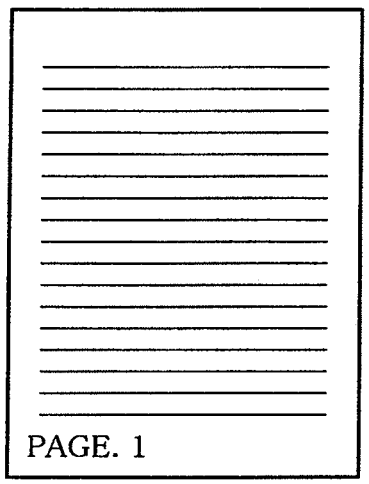

As shown in FIG. 10E, the fifth pattern corresponds to a state in which a page item and a title or a logo added to the page are positioned one above the other.

The added state determination portion 104 of FIG. 2 determines whether or not the state of each page corresponds to the first pattern by performing the process depicted in FIG. 11.

Referring to FIG. 11, the added state determination portion 104 refers to the page information table PGT1, the object list information PGT2, and the object information PGT3 in this order to confirm whether or not the page contains an object whose content type is a "body", and whose object type is an "image object" (#1001). If the page does not contain such an object (No in #1001), then the added state determination portion 104 determines that the state of the page does not correspond to the first pattern (#1002). If the page contains such an object (Yes in #1001), then the added state determination portion 104 compares a value set in the positional information of the object information PGT3 for the object with a value set in the positional information of the page item information table PIT. Thereby, the added state determination portion 104 determines whether or not a rectangular region within which the object is provided covers a rectangular region within which the page item is provided (#1003). If the page contains a plurality of objects corresponding to Step #1001, then the added state determination portion 104 makes the same determination as described above for each of the objects. If it is determined that at least one rectangular region within which an object is provided covers a rectangular region within which the page item is provided (Yes in #1003), then the added state determination portion 104 decides that the state of the page corresponds to the first pattern (#1004). Otherwise (No in #1003), the added state determination portion 104 decides that the state of the page does not correspond to the first pattern (#1002).

The added state determination portion 104 also determines whether or not the state of each page corresponds to the second pattern by performing the process depicted in FIG. 12.

Referring to FIG. 12, the added state determination portion 104 refers to the page information table PGT1, the object list information PGT2, and the object information PGT3 in this order to confirm whether or not the page contains an object whose content type is a "body", and whose object type is a "text object" (#1101). If the page does not contain such an object (No in #1101), then the added state determination portion 104 determines that the state of the page does not correspond to the second pattern (#1102). If the page contains such an object (Yes in #1101), then the added state determination portion 104 compares a value set in the positional information of the object information PGT3 for the object with a value set in the positional information of the page item information table PIT. Thereby, the added state determination portion 104 determines whether or not a rectangular region within which the object is provided covers a rectangular region within which the page item is provided (#1103). If the page contains a plurality of objects corresponding to Step #1101, then the added state determination portion 104 makes the same determination as described above for each of the objects. If it is determined that at least one rectangular region within which an object is provided covers a rectangular region within which the page item is provided (Yes in #1103), then the added state determination portion 104 decides that the state of the page corresponds to the second pattern (#1104). Otherwise (No in #1103), the added state determination portion 104 decides that the state of the page does not correspond to the second pattern (#1102).

The added state determination portion 104 further determines whether or not the state of each page corresponds to the third pattern by performing the process depicted in FIG. 13.

Referring to FIG. 13, the added state determination portion 104 compares a setting value of a font color in the font information of the page item information table PIT with a setting value of a background color in the page attributes of the page information table PGT1 (#1201). If it is determined that both the setting values are equal or similar to each other (Yes in #1201), then the added state determination portion 104 decides that the state of the page corresponds to the third pattern (#1203). If it is determined that both the setting values are neither equal nor similar to each other (No in #1201), then the added state determination portion 104 decides that the state of the page does not correspond to the third pattern (#1202). Whether or not both the setting values of the colors are similar to each other is determined based on, for example, whether or not the difference between both the setting values represented in RGB or CMYK format falls within a predetermined range.

The added state determination portion 104 further determines whether or not the state of each page corresponds to the fourth pattern by performing the process depicted in FIG. 14.

Referring to FIG. 14, the added state determination portion 104 refers to the page information table PGT1, the object list information PGT2, and the object information PGT3 in this order to confirm whether or not the page contains an object whose content type is a "pattern" (#1301). If the page does not contain such an object (No in #1301), then the added state determination portion 104 determines that the state of the page does not correspond to the fourth pattern (#1302). If the page contains such an object (Yes in #1301), then the added state determination portion 104 compares a value set in the positional information of the object information PGT3 for the object with a value set in the positional information of the page item information table PIT. Thereby, the added state determination portion 104 determines whether or not a rectangular region within which the object is provided covers a rectangular region within which the page item is provided (#1303). If the page contains a plurality of objects corresponding to Step #1301, then the added state determination portion 104 makes the same determination as described above for each of the objects. If it is determined that at least one rectangular region within which an object is provided covers a rectangular region within which the page item is provided (Yes in #1303), then the added state determination portion 104 decides that the state of the page corresponds to the fourth pattern (#1304). Otherwise (No in #1303), the added state determination portion 104 decides that the state of the page does not correspond to the fourth pattern (#1302).

The added state determination portion 104 further determines whether or not the state of each page corresponds to the fifth pattern by performing the process depicted in FIG. 15.

Referring to FIG. 15, the added state determination portion 104 refers to the page information table PGT1, the object list information PGT2, and the object information PGT3 in this order to confirm whether or not the page contains an object whose content type is a "title" or a "logo" (#1401). If the page does not contain such an object (No in #1401), then the added state determination portion 104 determines that the state of the page does not correspond to the fifth pattern (#1402). If the page contains such an object (Yes in #1401), then the added state determination portion 104 compares a value set in the positional information of the object information PGT3 for the object with a value set in the positional information of the page item information table PIT. Thereby, the added state determination portion 104 determines whether or not a rectangular region within which the object is provided covers a rectangular region within which the page item is provided (#1403). If the page contains a plurality of objects corresponding to Step #1401, then the added state determination portion 104 makes the same determination as described above for each of the objects. If it is determined that at least one rectangular region within which an object is provided covers a rectangular region within which the page item is provided (Yes in #1403), then the added state determination portion 104 decides that the state of the page corresponds to the fifth pattern (#1404). Otherwise (No in #1403), the added state determination portion 104 decides that the state of the page does not correspond to the fifth pattern (#1402).

If the added state determination portion 104 decides that the state of the page does not correspond to any of the first through fifth patterns, then the added state determination portion 104 determines that the state of the page corresponds to the sixth pattern. The sixth pattern corresponds to, for example, a state shown in FIG. 10F in which the page item is provided without being overlaid on any of the objects, and at the same time, the color of a text constituting the page item is not the same as or not similar to the background color of the page.

In this way, the state of content on each page is classified as, basically, any one of the first through sixth patterns.

There are, however, some cases in which the state of content on a page corresponds to a plurality of patterns redundantly.

One of the cases is that the state of content on a page corresponds to the third pattern and any of the first, second, fourth, and fifth patterns. To be specific, the case corresponds to a state in which the page item and any of the objects are positioned one above the other, and at the same time, the color of a text constituting the page item is the same as or similar to the background color of the page. The case exemplified in FIG. 16A corresponds to, for example, a state in which a page item and a text are positioned one above the other, and at the same time, the color of a text constituting the page item and the background color of the page are similar colors. In such a case, the added state determination portion 104 determines that the state of the page corresponds to the third pattern.

Another one of the cases is that the state of content on a page corresponds to two or more of the first, second, fourth, and fifth patterns. To be specific, the case corresponds to a state in which the page item and a plurality of the objects are positioned one above the other. The case exemplified in FIG. 16B corresponds to, for example, a state in which a page item is overlaid on both an image and a text. In such a case, the added state determination portion 104 determines that the state of the page corresponds to any one of the first, second, fourth, and fifth patterns in the following manner.

The added state determination portion 104 calculates, for each object, the ratio of an area of a rectangular region within which the page item is provided and which overlaps a rectangular region within which the object is provided to an area of the rectangular region within which the page item is provided. The added state determination portion 104, then, determines that the page item overlaps with an object corresponding to the highest ratio among ratios calculated for the individual objects as discussed above. Referring to the rectangular region within which the page item is provided as shown in FIG. 16B, a ratio corresponding to an area of a region 302 overlapping with the rectangular region within which a text is provided is larger than a ratio corresponding to an area of a region 301 overlapping with the rectangular region within which an image is provided. Accordingly, the added state determination portion 104 determines that the page item overlaps with the text. Stated differently, the added state determination portion 104 determines that the state of the page corresponds to the second pattern rather than the first pattern. If the page item overlaps with the individual objects at the same ratio, then the added state determination portion 104 determines that the state of the page corresponds to the sixth pattern.

In this manner, the added state determination portion 104 identifies the state of content on a page as any one of the first through sixth patterns, and registers, for each page, the pattern thus identified in the determination result of the added state determination table SJT. Upon finishing registering patterns for all the pages in the added state determination table SJT, the added state determination portion 104 conveys the added state determination table SJT created to the extraction result display portion 105.

The extraction result display portion 105 receives the added state determination table SJT, and displays the extraction result display dialogue DA2 on the screen of the display to inform the editor user of the extraction result of pages to which a page item may not be added properly.

To be specific, the extraction result display portion 105 counts, based on the added state determination table SJT, the number of pages S1-S6 corresponding to the first through sixth patterns respectively. The extraction result display portion 105 then counts the number of pages corresponding to any of the first through fifth patterns, i.e., S1+S2+S3+S4+S5. The extraction result display portion 105, then, calculates the ratio of the number of pages S1-S6 corresponding to the first through sixth patterns respectively to the total number of pages, i.e., S1+S2+S3+S4+S5+S6. The extraction result display portion 105, further, calculates the ratio of the number of pages corresponding to any of the first through fifth patterns, i.e., S1+S2+S3+S4+S5, to the total number of pages, i.e., S1+S2+S3+S4+S5+S6.

After finishing the count and the calculation, the extraction result display portion 105 displays the extraction result display dialogue DA2 on the screen of the display to inform the editor user of the count and calculation result.

To be specific, as shown in FIG. 17, the extraction result display portion 105 presents, in the extraction result display dialogue DA2, the number of pages corresponding to each of the first through sixth patterns as an extracted page quantity 401. Alternatively, the extraction result display portion 105 may present, instead of the number of such pages, the ratio of the number of pages corresponding to each of the first through sixth patterns to the total number of pages. Stated differently, the degree of quantity of pages classified depending on the state of content on the page is presented.

The extraction result display portion 105 further presents, in the extraction result display dialogue DA2, the ratio of the number of pages corresponding to any of the first through fifth patterns to the total number of pages as an extracted state 402. Alternatively, the extraction result display portion 105 may present, instead of the ratio mentioned above, the number of pages corresponding to any of the first through fifth patterns. Stated differently, the degree of quantity of pages to which a page item may not be added properly is presented.

The extraction result display dialogue DA2 is also provided with a selection release zone 403 for each of the first through fifth patterns. The selection release zone 403 is used to perform selection in such a manner that a page classified as any one of the first through fifth patterns is not dealt with as a page to which a page item may not be added properly. The extraction result display dialogue DA2 is also provided with a thumbnail display selection zone 404 used to select displaying thumbnail images of pages that have been classified as any one of the first through fifth patterns, or in other words, pages in which a page item has been added. In short, the thumbnail display selection zone 404 is used to display such pages as thumbnails. The selection release zone 403 and the thumbnail display selection zone 404 are provided in the form of, for example, a checkbox.

Then, the editor user confirms the extracted page quantity 401, the extracted state 402, and the like, and turns ON the selection release zone 403 provided for a pattern, among the first through fifth patterns, which has been determined to be excludable as a cause due to which a page item is not added properly. For example, when the editor user determines that a state in which a page item and an image imported from draft data DD are positioned one above the other is negligible, he/she turns ON a checkbox provided for the first pattern and presses the "OK" button.

Before performing the operation to turn ON the selection release zone 403 for a pattern, the editor user can collectively confirm pages identified as the pattern in order to determine whether or not the pattern is excludable. For the confirmation, the editor user turns ON the thumbnail display selection zone 404 provided for the pattern.

Responding to this operation, the extraction result display portion 105 obtains, from the edit data creating portion 102, the page item information table PIT and the page information table PGT1 for a page identified as the pattern selected in the thumbnail display selection zone 404 by the editor user. Then, based on the information contained in these tables, the extraction result display portion 105 displays, on the screen of the display, the corresponding page list TN including thumbnail images of the pages identified as the pattern in a window different from the layout window LW, as illustrated in FIG. 18.

In the meantime, when the editor user selects a pattern in the selection release zone 403, the added state changing portion 106 obtains the added state determination table SJT from the added state determination portion 104, and updates the determination result of the added state determination table SJT.

To be specific, the added state changing portion 106 changes the determination result of the added state determination table SJT for a page determined to correspond to the pattern selected by the editor user in the selection release zone 403 to indicate the sixth pattern. Stated differently, the page determined to correspond to the pattern selected by the editor user is not handled as a page having a possibility that a page item is not added properly.

The added state changing portion 106 conveys the added state determination table SJT updated in this manner to the confirmed page list display portion 107.

In the case where the editor user does not select any of the patterns in the selection release zone 403, the added state changing portion 106 does not update the added state determination table SJT obtained from the added state determination portion 104, and conveys the same to the confirmed page list display portion 107.

When the confirmed page list display portion 107 receives the updated added state determination table SJT, in order to prompt the editor user to confirm whether or not a page item is added properly to a page, the confirmed page list display portion 107 highlights a page icon corresponding to the page for which such confirmation should be made in the page list map frame LSF2.

To be specific, the confirmed page list display portion 107 displays the page list map frame LSF2 in such a manner that a page icon corresponding to a page classified as any of the first through fifth patterns in the determination result of the updated added state determination table SJT is highlighted as compared to a page icon corresponding to a page classified as the sixth pattern. For example, as illustrated in FIG. 19, the color of the former page icons is made conspicuous for display as compared with the color of the latter page icons. Stated differently, page icons to be highlighted are page icons corresponding to pages obtained by omitting a page classified as the pattern excluded by the editor user from pages that are represented in the extraction result display dialogue DA2 as pages to which a page item may not be added properly.

Then, the editor user selects the highlighted page icon; thereby to display a page corresponding to the highlighted page icon in the page frame LSF1, and to confirm in what way a page item is added. In short, the editor user visually confirms whether or not the page item is added properly.

There are various methods for dealing with a case in which it is found that a page item is not added properly. The following is a description, with reference to FIG. 20, of an example of a method for dealing with a case in which a page item and any object are positioned one above the other.

When receiving, from the editor user, a request to change the position at which the page item has been added, the edit data creating portion 102 detects, in the page, destination candidate regions 502 that correspond to regions where no objects are added, and at the same time, have a size greater than a region occupied by the page item. For example, if the page state is as that illustrated in FIG. 20, the edit data creating portion 102 detects a destination candidate region 502a and a destination candidate region 502b.

Next, the edit data creating portion 102 selects, from among the detected destination candidate regions 502, as a destination region 503, the destination candidate region 502 closest to an original region 501 corresponding to a region where the original page item is provided. In the case of FIG. 20, for example, the destination candidate region 502b is selected as the destination region 503 because the destination candidate region 502b is closer to the original region 501 than the destination candidate region 502a is.

The edit data creating portion 102, then, changes the position at which the page item is provided to a predetermined position in the determined destination region 503. In the illustrated example of FIG. 20, the position at which the page item is provided is changed to a predetermined position in the destination candidate region 502b that has been selected as the destination region 503.

In this way, edit data ED is created by performing the predetermined editing process based on the draft data DD.

In the end, when the editor user selects a print menu, the edit data creating portion 102 sends the edit data ED to the printer 2 through the printer driver or the like. The printer 2, then, prints the details of the edit data ED.

The first embodiment discussed above enables an editor user to easily specify a page having a possibility that a page item is not added properly. It is, thus, not necessary for the editor user to confirm whether or not a page item has been added to each page, but it is simply a matter of making such a confirmation only for the specified page. This shortens a time to perform a process of adding a page item.

Second Embodiment

FIG. 21 is a diagram illustrating an example of an electronic file in which a plurality of page numbers are collectively written.

As with the first embodiment, the second embodiment also purposes to prompt an editor user to confirm a page having a possibility that a page item is not added properly. The second embodiment, however, uses a way different from that of the first embodiment to prompt the editor user to confirm such a page. The second embodiment describes an example in which, when the editor user performs operation to add page items to the individual pages of a document to be edited, an electronic file containing page numbers of pages to which a page item may not be added appropriately is created, and the editor user is prompted to confirm the pages corresponding to the page numbers contained in the electronic file.

The below description focuses on the points that differ from the first embodiment, and description of points that are identical with those in the first embodiment may be omitted.

Upon receiving the updated added state determination table SJT, the confirmed page list display portion 107 generates, below a preset directory, an electronic file in which page numbers of pages that have been classified as the first through fifth patterns in the determination result of the updated added state determination table SJT. As shown in FIG. 21, for example, the confirmed page list display portion 107 generates a text file containing page numbers of pages that have been classified as the first through fifth patterns.

A user starts an application program to open the electronic file generated, and confirms the page numbers contained therein. When the text file shown in FIG. 21 is generated, for example, the user uses a text editor or the like to open the text file, and confirms the page numbers written therein.

In this way, the second embodiment also enables an editor user to easily specify a page having a possibility that a page item is not added properly. In addition, page numbers of such pages are saved in an electronic file, there is no difficulty in performing the editing operation even when a user suspends the editing operation once and thereafter resumes the same.

Third Embodiment

Figure 22:
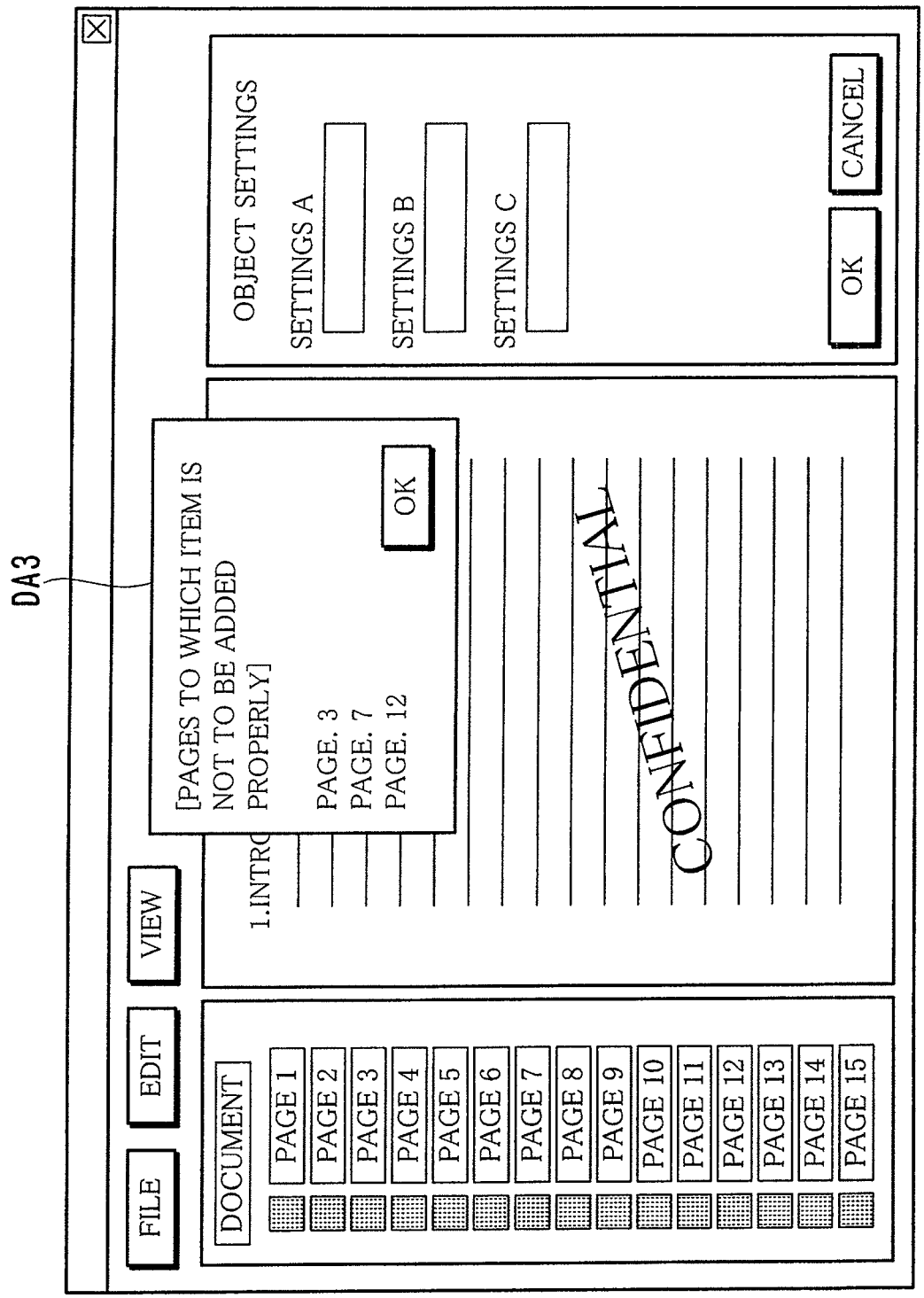
FIG. 22 is a diagram illustrating an example of a page number list dialogue.

FIG. 22 is a diagram illustrating an example of a page number list dialogue DA3.

As with the first and second embodiments, the third embodiment also purposes to prompt an editor user to confirm a page having a possibility that a page item is not added properly. The third embodiment, however, uses a way different from those of the first and second embodiments to prompt the editor user to confirm such a page. The third embodiment describes an example in which, when the editor user performs operation to add page items to the individual pages of a document to be edited, a pop-up containing page numbers of pages to which a page item may not be added appropriately is displayed, and thereby the editor user is prompted to confirm the pages corresponding to the page numbers contained in the pop-up.

The below description focuses on the points that differ from the first and second embodiments, and description of points that are identical with those in the first and second embodiments may be omitted.

Upon receiving the updated added state determination table SJT, the confirmed page list display portion 107 displays, on the screen of the display, the page number list dialogue DA3 through which the editor user is informed of page numbers of pages that have been determined to correspond to the first through fifth patterns in the determination result of the updated added state determination table SJT. As shown in FIG. 22, for example, the confirmed page list display portion 107 displays the page number list dialogue DA3 in which page numbers of pages that have been classified as the first through fifth patterns are presented.

In this way, the third embodiment also enables an editor user to easily specify a page having a possibility that a page item is not added properly. In addition, page numbers of such pages are presented in the page number list dialogue DA3. Thus, the editor user is prompted to make the confirmation even if the page list map frame LSF2 is not displayed because he/she wishes to keep the region of the page frame LSF1 large.

Figure 23:
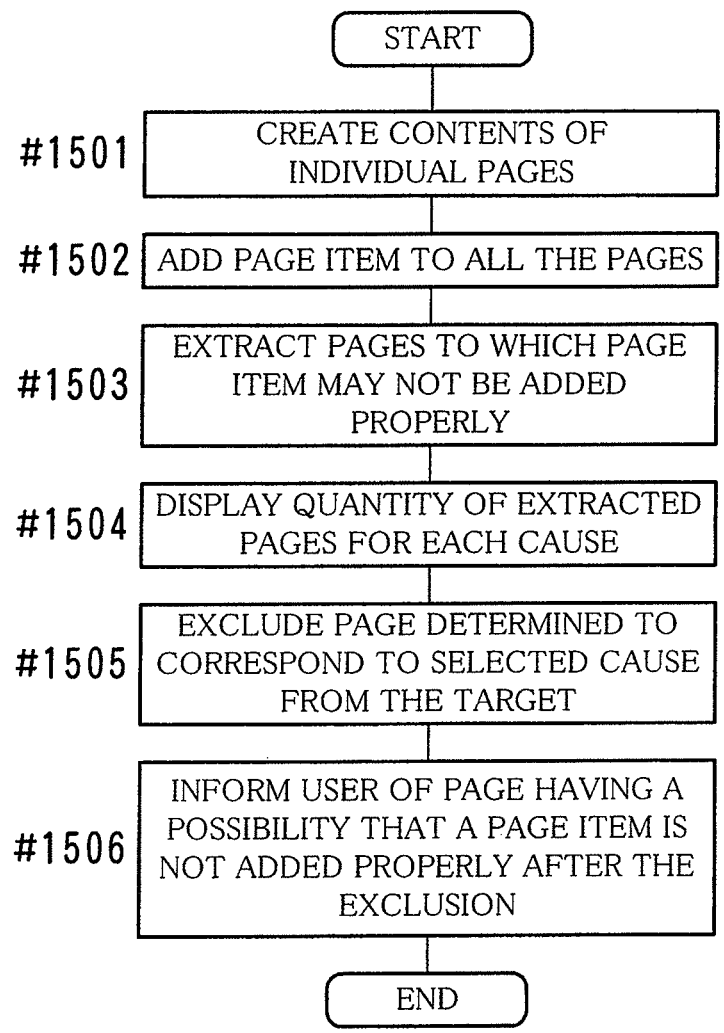
FIG. 23 is a flowchart illustrating an example of the overall processing flow of a document editing apparatus.

FIG. 23 is a flowchart illustrating an example of the overall processing flow of the document editing apparatus 1.

An example of the overall processing flow of the document editing apparatus 1 common to the first through third embodiments is described below with reference to the flowchart of FIG. 23.

Referring to FIG. 23, the document editing apparatus 1 creates contents of the individual pages by importing draft data DD and adding an object to the pages in accordance with instructions from an editor user (#1501). When the editor user selects a function to add a page item, the document editing apparatus 1 adds the page item to all the pages based on entered setting values and the like (#1502). The document editing apparatus 1 extracts, for each cause, pages to which a page item may not be added properly (#1503). The document editing apparatus 1 displays the quantity of extracted pages for each cause (#1504). When the editor user selects a cause to be excluded, the document editing apparatus 1 excludes a page determined to correspond to the selected cause from the target of pages to which a page item may not be added properly (#1505). In the end, the document editing apparatus 1 informs the editor user of a page that has a possibility that a page item is not added properly and is classified as a cause other than the excluded cause, as a page to which confirmation should be made by the editor user (#1506).

In the first and third embodiments, the editor user performs operation to add a page item to all the pages in the page item setting dialogue DA1. Instead, however, he/she may perform operation to add a page item only to a plurality of predetermined pages. When the editor user performs such operation, the edit data creating portion 102 may set "display" as the header/footer display/non-display flag in the page attributes of the page information table PGT1 for the plurality of predetermined pages. Then, the added state determination portion 104 specifies, as any one of the first through sixth patterns, the state of content on each predetermined page for which "display" has been set as the header/footer display/non-display flag in the page attributes of the page information table PGT1. The added state determination portion 104 may determine that a page other than the plurality of predetermined pages corresponds to the sixth pattern.

In the first and third embodiments, the added state determination portion 104 is configured to, even when a content state of a page corresponds to a plurality of patterns, classify the content state as any one of the first through sixth patterns and registers the classified pattern in the added state determination table SJT. In such a case, however, another configuration is possible in which a determination result indicating the fact that the content state corresponds to a plurality of patterns is registered in the added state determination table SJT.

In the first and third embodiments, the extraction result display portion 105 is configured to present the number of pages having a possibility that a page item is not added properly, or the ratio of the number of such pages to the total number of pages. Instead, however, the extraction result display portion 105 may present information through which the editor user can directly figure out the quantity of pages to be confirmed. For example, the extraction result display portion 105 may present such information in the form of a bar graph or a circle graph.

In the embodiments discussed above, the overall configuration of the document editing apparatus 1, the content and the order of processes performed thereby, the configuration of the tables, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An apparatus for editing a document containing a plurality of pages, each of the plurality of pages including one or more first objects, the apparatus comprising:

a processor that adds a second object to each of the plurality of pages and determines for each of the plurality of pages, whether the respective page is an improper page by determining whether a state of content on each of the plurality of pages corresponds to any of a plurality of causes due to which the second object is not added properly;

a display that displays, for each of the plurality of causes, a quantity of improper pages thus determined;

an input unit that receives input to exclude, from the improper pages, a selected page corresponding to a cause selected by a user; and an informing portion that informs the user of a to-be-confirmed page that corresponds to the improper pages remaining after excluding the selected page, wherein if a page is determined to be an improper page due to more than one cause of the plurality of causes, the improper page is attributed to a cause based on a ratio of an overlap of an area of the second object and an area of one of the first objects on the improper page.

2. The apparatus according to claim 1, further comprising a thumbnail display portion that displays thumbnail images of the improper pages determined for each cause.

3. The apparatus according to claim 1, wherein the second object is a page number, a watermark, a date, a company logo, a magazine title, or a book title.

4. The apparatus according to claim 1, wherein the causes are at least one of the following:

the second object and an object corresponding to the first object whose data represents an image are placed one above the other;

the second object and an object corresponding to the first object whose data represents a text are placed one above the other;

a color of a text constituting the second object and a color of a background of a page on which the second object is placed are equal or similar to each other;

the second object and an object corresponding to the first object whose type is a pattern are placed one above the other; and the second object and an object corresponding to the first object whose type is a title or a logo are placed one above the other.

5. The apparatus according to claim 1, wherein the informing portion informs the user of the to-be-confirmed page by displaying highlighted page icons corresponding to the remaining improper pages.

6. The apparatus according to claim 1, wherein the informing portion informs the user of the to-be-confirmed page by generating an electronic file containing, therein, page numbers of the remaining improper pages, and opening the electronic file through an operation performed by the user.

7. The apparatus according to claim 1, wherein the informing portion informs the user of the to-be-confirmed page by displaying a pop-up containing, therein, page numbers of the remaining improper pages.

8. A method for editing a document containing a plurality of pages, each of the plurality of pages including one or more first objects, the method being used in an apparatus for editing the document and that comprises a processor, the method comprising:

adding, using the processor, a second object to said each of the plurality of pages;

determining, using the processor, for each of the plurality of pages, whether the respective page is an improper page by determining whether a state of content on each of the plurality of pages corresponds to any of a plurality of causes due to which the second object is not added properly;

displaying, using a display, for each of the plurality of causes, a quantity of improper pages thus determined;

excluding, using the processor, from the improper pages, a selected page corresponding to a cause selected by a user; and informing, using the display, the user of a to-be-confirmed page that corresponds to the improper pages remaining after excluding the selected page, wherein if a page is determined to be an improper page due to more than one cause of the plurality of causes, the improper page is attributed to a cause based on a ratio of an overlap of an area of the second object and an area of one of the first objects on the improper page.

9. The method according to claim 8, further comprising causing the apparatus to perform a thumbnail display process of displaying thumbnail images of the improper pages determined for each cause.

10. The method according to claim 8, wherein the second object is a page number, a watermark, a date, a company logo, a magazine title, or a book title.

11. The method according to claim 8, wherein the causes are at least one of the following:

the second object and an object corresponding to the first object whose data represents an image are placed one above the other;

the second object and an object corresponding to the first object whose data represents a text are placed one above the other;

a color of a text constituting the second object and a color of a background of a page on which the second object is placed are equal or similar to each other;

the second object and an object corresponding to the first object whose type is a pattern are placed one above the other; and the second object and an object corresponding to the first object whose type is a title or a logo are placed one above the other.

12. The method according to claim 8, wherein the informing process includes informing the user of the to-be-confirmed page by displaying highlighted page icons corresponding to the remaining improper pages.

13. The method according to claim 8, wherein the informing process includes informing the user of the to-be-confirmed page by generating an electronic file containing, therein, page numbers of the remaining improper pages, and opening the electronic file through an operation performed by the user.

14. The method according to claim 8, wherein the informing process includes informing the user of the to-be-confirmed page by displaying a pop-up containing, therein, page numbers of the remaining improper pages.

15. A non-transitory computer-readable storage medium storing thereon a computer program used in an apparatus, comprising a processor, for editing a document containing a plurality of pages, each of the plurality of pages including one or more first objects, the computer program causing the apparatus to perform:

an adding process of adding, using the processor, a second object to said each of the plurality of pages;

a determining process of determining, using the processor, for each of the plurality of pages, whether the respective page is an improper page by determining whether a state of content on each of the plurality of pages corresponds to any of a plurality of causes due to which the second object is not added properly;

a quantity display process of displaying, using a display, for each of the plurality of causes, a quantity of improper pages thus determined;

an excluding process of excluding, using the processor, from the improper pages, a selected page corresponding to a cause selected by a user; and an informing process of informing, using the display, the user of a to-be-confirmed page that corresponds to the improper pages remaining after excluding the selected page, wherein if a page is determined to be an improper page due to more than one cause of the plurality of causes, the improper page is attributed to a cause based on a ratio of an overlap of an area of the second object and an area of one of the first objects on the improper page.

16. The non-transitory computer-readable storage medium according to claim 15, further comprising causing the apparatus to perform a thumbnail display process of displaying thumbnail images of the remaining improper pages determined for each cause.

17. The non-transitory computer-readable storage medium according to claim 15, wherein the second object is a page number, a watermark, a date, a company logo, a magazine title, or a book title.

18. The non-transitory computer-readable storage medium according to claim 15, wherein the causes are at least one of the following:

the second object and an object corresponding to the first object whose data represents an image are placed one above the other;

the second object and an object corresponding to the first object whose data represents a text are placed one above the other;

a color of a text constituting the second object and a color of a background of a page on which the second object is placed are equal or similar to each other;

the second object and an object corresponding to the first object whose type is a pattern are placed one above the other; and the second object and an object corresponding to the first object whose type is a title or a logo are placed one above the other.

19. The non-transitory computer-readable storage medium according to claim 15, wherein the informing process includes informing the user of the to-be-confirmed page by displaying highlighted page icons corresponding to the remaining improper pages.

20. The non-transitory computer-readable storage medium according to claim 15, wherein the informing process includes informing the user of the to-be-confirmed page by generating an electronic file containing, therein, page numbers of the improper pages, and opening the electronic file through an operation performed by the user.

21. The non-transitory computer-readable storage medium according to claim 15, wherein the informing process includes informing the user of the to-be-confirmed page by displaying a pop-up containing, therein, page numbers of the remaining improper pages.

* * * * *